(12) United States Patent
Imaeda

(10) Patent No.: US 10,001,058 B2
(45) Date of Patent: Jun. 19, 2018

(54) HEAT GENERATION RATE WAVEFORM CALCULATION DEVICE OF INTERNAL COMBUSTION ENGINE AND METHOD FOR CALCULATING HEAT GENERATION RATE WAVEFORM

(71) Applicant: TOYOTA JIDOSHA KABUSHIKI KAISHA, Toyota-shi, Aichi (JP)

(72) Inventor: Munenori Imaeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 15/304,975

(22) PCT Filed: Feb. 18, 2015

(86) PCT No.: PCT/JP2015/054469
§ 371 (c)(1),
(2) Date: Oct. 18, 2016

(87) PCT Pub. No.: WO2015/162983
PCT Pub. Date: Oct. 29, 2015

(65) Prior Publication Data
US 2017/0184018 A1   Jun. 29, 2017

(30) Foreign Application Priority Data

Apr. 22, 2014 (JP) .................................. 2014-088036

(51) Int. Cl.
*F02B 77/08* (2006.01)
*F02D 41/26* (2006.01)
(Continued)

(52) U.S. Cl.
CPC .......... *F02B 77/084* (2013.01); *F02B 77/086* (2013.01); *F02B 77/087* (2013.01);
(Continued)

(58) Field of Classification Search
CPC .... F02B 77/084; F02B 77/086; F02B 77/087; F02B 77/089; F02D 41/26; F02D 41/263;
(Continued)

(56) References Cited

U.S. PATENT DOCUMENTS 6,763,806 B2   7/2004   Hosoya
2007/0250251 A1*   10/2007   Green, Jr. ............. F02B 77/085
701/105
(Continued)

FOREIGN PATENT DOCUMENTS

EP   2860380 A1   4/2015
JP   S59-136543 A   8/1984
(Continued)

*Primary Examiner* — Erick Solis
*Assistant Examiner* — Anthony L Bacon
(74) *Attorney, Agent, or Firm* — Oliff PLC

(57) ABSTRACT

A combustion speed, for example, is estimated or evaluated, with a required accuracy, more simply than the conventional art, while reducing man-hours to produce a heat generation rate waveform of an internal combustion engine. An increase rate of a heat generation rate relative to a change in a crank angle in a heat generation rate increasing period (e.g., a first-half combustion period a) in which the heat generation rate increases after ignition of an air-fuel mixture is defined as a heat generation rate gradient b/a that is one of characteristic values of the heat generation rate waveform. The heat generation rate gradient is estimated based on a fuel density (e.g., fuel density $\rho_{fuel@dQpeak}$ at heat generation rate maximum time) at a predetermined time set in advance in the heat generation rate increasing period so as to produce the heat generation rate waveform using the estimated heat generation rate gradient.

11 Claims, 17 Drawing Sheets

(51) Int. Cl.
  *G01M 15/04* (2006.01)
  *G01M 15/05* (2006.01)
  *G01M 15/08* (2006.01)

(52) U.S. Cl.
  CPC ............ *F02B 77/089* (2013.01); *F02D 41/26* (2013.01); *G01M 15/046* (2013.01); *G01M 15/048* (2013.01); *G01M 15/05* (2013.01); *G01M 15/08* (2013.01)

(58) Field of Classification Search
  CPC ........ F02D 2200/0614; G01M 15/046; G01M 15/048; G01M 15/05; G01M 15/08
  See application file for complete search history.

(56) References Cited

U.S. PATENT DOCUMENTS

| | | | |
|---|---|---|---|
| 2015/0142294 A1* | 5/2015 | Hagari | G01M 15/08 701/101 |
| 2016/0053702 A1* | 2/2016 | Nada | F02D 41/403 123/294 |
| 2016/0265459 A1* | 9/2016 | Nagano | F02D 41/3836 |

FOREIGN PATENT DOCUMENTS

| | | |
|---|---|---|
| JP | 2002-310049 A | 10/2002 |
| JP | 2007-177654 A | 7/2007 |
| JP | 2010-196556 A | 9/2010 |
| JP | 2012-219752 A | 11/2012 |
| JP | 5716869 B2 | 5/2015 |
| WO | 2013/183163 A1 | 12/2013 |

\* cited by examiner

FIG.19
(a)
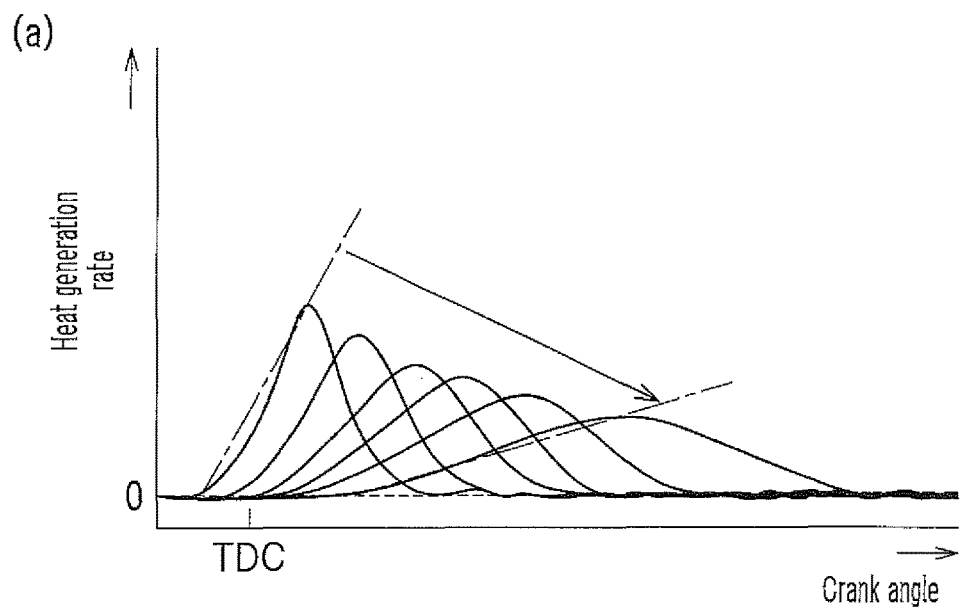
(b)
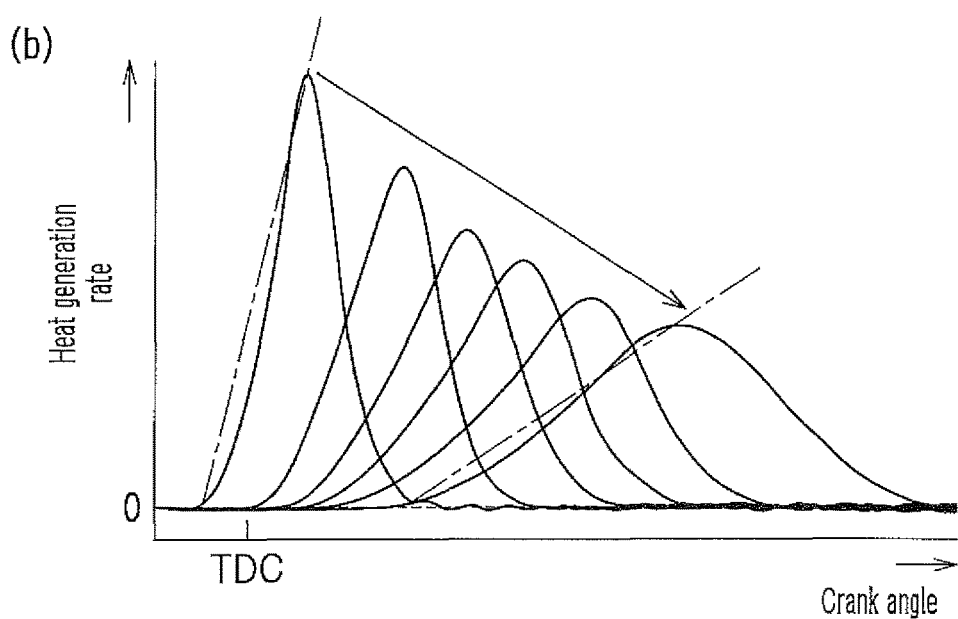

FIG.22
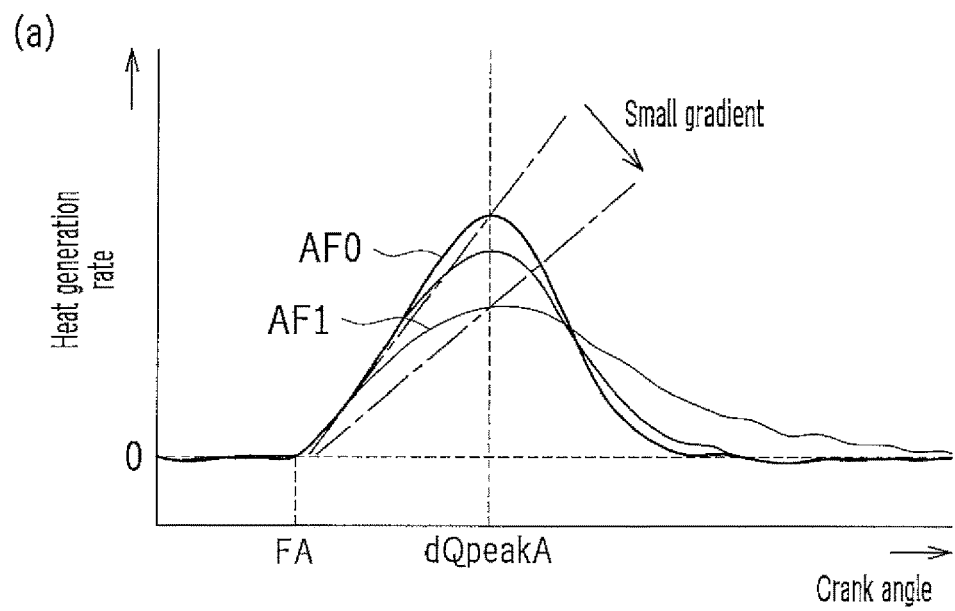
(a)
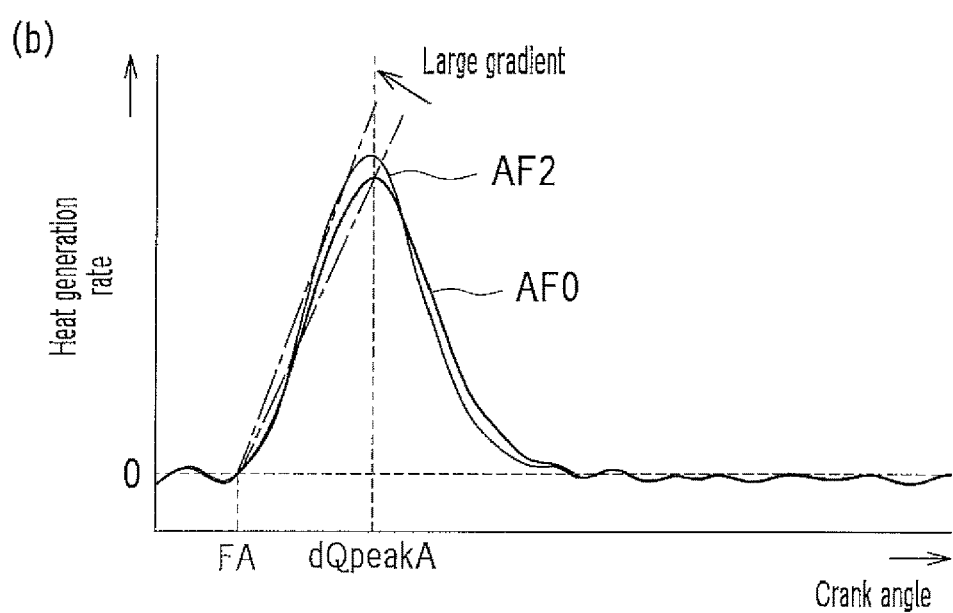
(b)

$\rho_{\text{fuel@dQpeak}} \times Q_{\text{all}}/n_{\text{air}}$

HEAT GENERATION RATE WAVEFORM CALCULATION DEVICE OF INTERNAL COMBUSTION ENGINE AND METHOD FOR CALCULATING HEAT GENERATION RATE WAVEFORM

TECHNICAL FIELD

The present invention relates to a device for calculating a heat generation rate waveform of a spark-ignition internal combustion engine and a method therefor, and in particular, to technique for obtaining a heat generation rate waveform by focusing attention on a combustion speed when the heat generation rate increases after ignition of an air-fuel mixture.

BACKGROUND ART

Conventionally, the heat generation rate in a cylinder is approximated by the Wiebe function in order to express a combustion state of an internal combustion engine. With the Wiebe function, the heat generation rate waveform can be appropriately expressed by identifying a plurality of parameters. The Wiebe function is used for estimating the heat generation rate or the combustion mass rate due to combustion in the internal combustion engine.

For example, in a method for determining Wiebe function parameters described in Patent Document 1, a shape parameter m of the Wiebe function is identified by a predetermined expression based on a combustion rate at a crank angle where the heat generation rate is maximum. Other parameters such as k, $a/\theta_p^{m+1}$, and $\theta_b$ are also identified by the respective predetermined expressions, thus the Wiebe function can be determined so that it is adapted to an actual heat generation pattern with a high accuracy.

Patent Document 1 describes that, by determining the Wiebe function by identifying the plurality of parameters such as m, k, $a/\theta_p^{m+1}$, and $\theta_b$ under various operation conditions, it is possible to understand the relationships between the above parameters and operation parameters (e.g., the load rate, the rotation speed, the air-fuel ratio and the spark time) of the internal combustion engine. Thus, by using the relationships as understood above, it is possible to determine the Wiebe function under any operation condition of the internal combustion engine, which results in accurate expression of the combustion state of the internal combustion engine.

PRIOR ART DOCUMENT

Patent Document

Patent Document 1: JP 2007-177654 A

SUMMARY OF INVENTION

Problem to be Solved by Invention

However, Patent Document 1 does not disclose any specific method for identifying the relationships between the parameters m, k, $a/\theta_p^{m+1}$ and $\theta_b$ of the Wiebe function and the operation parameters of the internal combustion engine. For this reason, the parameters m, k, $a/\theta_p^{m+1}$ and $\theta_b$ should be actually identified under almost all operation conditions so as to determine the Wiebe function under the respective operation conditions. That is, in the conventional method, there is still room for further reducing man-hours to produce the combustion rate waveform and thus reducing costs.

Also, in the above-described method, the entire heat generation rate waveform can be expressed only by identifying the respective parameters m, k, $a/\theta_p^{m+1}$ and $\theta_b$ to determine the Wiebe function, and based on the above, it is possible to evaluate the combustion state. Thus, it is not possible to estimate and evaluate, for example, only the initial combustion speed using a simple method, without expressing the entire heat generation rate waveform.

The present invention was made in consideration of the above circumstances. An object of the present invention is to reduce man-hours to produce (calculate) the heat generation rate waveform by focusing attention on the combustion speed, which is one of the indexes representing the combustion state, so as to estimate and evaluate, for example, the combustion speed more simply than using the conventional art while ensuring a required accuracy.

Means for Solving Problem

Solution Principles of Invention

It was newly found, by the Inventor of the present invention, that an increase rate of the heat generation rate (i.e., heat generation rate gradient) is highly correlated with the fuel density when the air-fuel mixture is ignited by spark ignition and combusted to increase the heat generation rate, and that influence of the engine load rate and the spark time on the heat generation rate gradient can be collectively expressed by the fuel density.

The solution principles of the present invention are based on such a new finding, which are to use the heat generation rate gradient as one of characteristic values of the heat generation rate waveform so as to estimate the heat generation rate gradient based on the fuel density.

Solving Means

Specifically, the present invention is directed to a heat generation rate waveform calculation device that is configured to calculate a heat generation rate waveform of a spark-ignition internal combustion engine. In this device, an increase rate of a heat generation rate relative to a change in a crank angle in a heat generation rate increasing period in which the heat generation rate increases after ignition of an air-fuel mixture is defined as a heat generation rate gradient that is one of characteristic values of the heat generation rate waveform. Then, the heat generation rate gradient is estimated based on an in-cylinder fuel density at a predetermined time that is set in advance in the heat generation rate increasing period, so that the heat generation rate waveform is calculated using the estimated heat generation rate gradient.

In the above-described configuration, when the combustion of the air-fuel mixture in the cylinder of the internal combustion engine is modeled and the heat generation rate waveform is calculated, a parameter that represents a combustion speed in the period in which the heat generation rate increases after the ignition of the air-fuel mixture is used as one of the characteristic values of the heat generation rate waveform. That is, the parameter means the increase rate of the heat generation rate (heat generation rate gradient) relative to the change in the crank angle. The heat generation rate gradient changes depending on various operation conditions such as the engine load rate, the rotation speed, the air-fuel ratio, the spark time, the exhaust gas recirculation (EGR) rate, and the oil-water temperature. However, the influence of the engine load rate and the spark time can be collectively expressed by one parameter, i.e., the fuel density in the heat generation rate increasing period.

The heat generation rate gradient is estimated based on the in-cylinder fuel density at the predetermined time that is set in advance (for example, the time where the heat generation rate reaches the predetermined heat generation rate such as 80% of the maximum heat generation rate) in the heat generation rate increasing period. Thus, it is possible to reduce man-hours to estimate the heat generation rate gradient compared with the case in which it is estimated based on both the engine load rate and the spark time. Furthermore, using the above estimated heat generation rate gradient also can reduce man-hours to calculate the heat generation rate waveform.

Also, it is not necessary to produce the entire heat generation rate waveform. As described above, only the heat generation rate gradient can be estimated based on the fuel density. Thus, it is possible to estimate/evaluate the combustion speed in the period in which the heat generation rate increases after the ignition of the air-fuel mixture more simply than by the conventional art, while ensuring a required accuracy.

The above predetermined time may be set in the heat generation rate increasing period. However, when the correlation between the change in the heat generation rate and the fuel density of the air-fuel mixture was studied, it was found that the average increase rate of the heat generation rate (heat generation rate gradient) in the period from the ignition time of the air-fuel mixture to a heat generation rate maximum time especially has a high correlation with the in-cylinder fuel density at the heat generation rate maximum time, which is not likely to be affected by the change in the engine operation condition and the like (i.e., the heat generation rate gradient is estimated with high robustness).

Thus, it is preferable that the above predetermined time is defined as the heat generation rate maximum time, and that the average increase rate of the heat generation rate (heat generation rate gradient) in the period from the ignition time of the air-fuel mixture to the heat generation rate maximum time is calculated based on the fuel density at the heat generation rate maximum time.

Specifically, the heat generation rate gradient can be calculated as a linear function of the fuel density at the heat generation rate maximum time. Also, the fuel density at the heat generation rate maximum time can be calculated by dividing the fuel amount that exists in the cylinder when the heat generation rate is maximum by the volume in the cylinder (in-cylinder volume) at that time. It is preferable to divide, by the in-cylinder volume, the fuel amount that actually burns in the cylinder except the unburned amount. For this reason, when the heat generation rate gradient is estimated as described above, it may be multiplied by a correction coefficient based on the combustion efficiency.

Also, when the heat generation rate gradient is estimated, it may be multiplied by a correction coefficient based on the engine rotation speed (for example, an exponential function of the engine rotation speed). That is, when the engine rotation speed changes, generally the flow strength in the cylinder changes. Thus, the combustion speed is affected by a turbulence, and changes. Therefore, a correction based on the engine rotation speed may be performed so that the change in the combustion speed can be reflected and that the heat generation rate gradient can be estimated with a higher accuracy.

If the influence of the turbulence in the cylinder is considered, when the heat generation rate gradient is estimated as described above, it may be multiplied by a correction coefficient based on the in-cylinder volume at the heat generation rate maximum time (for example, an exponential function of the in-cylinder volume at the heat generation rate maximum time). In the combustion (expansion) stroke of the cylinder, as the in-cylinder volume increases because of downstroke of the piston, the turbulence reduces, which results in reduction in the combustion speed.

Further, when the heat generation rate gradient is thus estimated, it may be multiplied by correction coefficient(s) based on the air-fuel ratio and/or the EGR rate (for example, an exponential function of the air-fuel ratio and the like). In this way, the influence of the change in the air-fuel ratio and/or the EGR rate on the combustion speed can be suitably reflected, thus the heat generation rate gradient can be estimated with a higher accuracy. Specifically, it is possible to suitably reflect reduction in the combustion speed of the air-fuel mixture to the heat generation rate gradient, the speed reduction caused by the air-fuel ratio being leaner than the theoretical air-fuel ratio and/or by the EGR rate being high.

Examples of the heat generation rate waveform, which is calculated using the heat generation rate gradient calculated as described above, include a triangular waveform with a crank angle period from the ignition the air-fuel mixture to combustion completion as a base and the heat generation rate at the heat generation rate maximum time as an apex. When the heat generation rate waveform is approximated by the triangular waveform, the gradient of an oblique side of the triangle that represents the heat generation rate from the ignition time to the heat generation rate maximum time is defined as the heat generation rate gradient.

In this case, it is preferable that the triangular waveform is produced under the condition that the period from the ignition time of the fuel mixture to the heat generation rate maximum time is determined mainly by the engine rotation speed and the spark time, but not by any of the engine load rate, the air-fuel ratio, the EGR rate and the oil-water temperature. That is, even when the combustion speed of the air-fuel mixture changes because of the changes in the engine load rate, the air-fuel ratio, the EGR rate and the like, the period from the ignition time to the heat generation rate maximum time does not change, thus the triangular waveform is produced under the condition that the maximum heat generation rate changes by the change in the heat generation rate gradient. In this way, it is possible to further reduce man-hours to produce the heat generation rate waveform.

From another standpoint, the present invention is directed to a method for calculating a heat generation rate waveform of a spark-ignition internal combustion engine. The method includes the steps of; defining an increase rate of the heat generation rate relative to a change in the crank angle in the heat generation rate increasing period in which the heat generation rate increases after ignition of an air-fuel mixture as the heat generation rate gradient that is one of characteristic values of the heat generation rate waveform; estimating the heat generation rate gradient based on the in-cylinder fuel density at a predetermined time that is set in advance in the heat generation rate increasing period; and calculating the heat generation rate waveform using the estimated heat generation rate gradient.

In this case also, the predetermined time may be defined as the heat generation rate maximum time, thus, it is possible to calculate an average increase rate of the heat generation rate (heat generation rate gradient) in the period from the ignition time of the air-fuel mixture to the heat generation rate maximum time as a linear function of the fuel density at the heat generation rate maximum time.

Effects of Invention

In the present invention, the heat generation rate gradient is used as one of the characteristic values of the heat generation rate waveform in the period in which the heat generation rate increases after the ignition of the air-fuel mixture, and the heat generation rate gradient is estimated based on the fuel density. Thus, it is possible to reduce man-hours to produce (calculate) the heat generation rate waveform, and to estimate and evaluate the combustion state in the initial combustion speed more simply than using the conventional art while ensuring a required accuracy, without producing the entire heat generation rate waveform.

BRIEF DESCRIPTION OF DRAWINGS

FIG. 9(a) indicates the case in which the spark time SA is before the top dead center (BTDC), while FIG. 9(b) indicates the case in which the spark time SA is after the top dead center (ATDC).

FIG. 19 are graphs indicating the heat generation rate waveforms obtained in the respective engine operation states that differ from one another only in the spark time SA, the heat generation rate waveforms being indicated in a manner overlapping with one another.

FIG. 21(a) is a plan view viewed in an axial direction of the cylinder, while FIG. 21(b) is a side view.

FIG. 22 are graphs indicating influence on the heat generation rate gradient b/a due to changes in the air-fuel ratio.

MODES FOR CARRYING OUT INVENTION

Hereinafter, embodiments of the present invention will be described with reference to the drawings. In this embodiment, the present invention is applied to a heat generation rate waveform calculation device for calculating (producing) a heat generation rate waveform of a vehicle gasoline engine (spark ignition engine).

Figure 1:
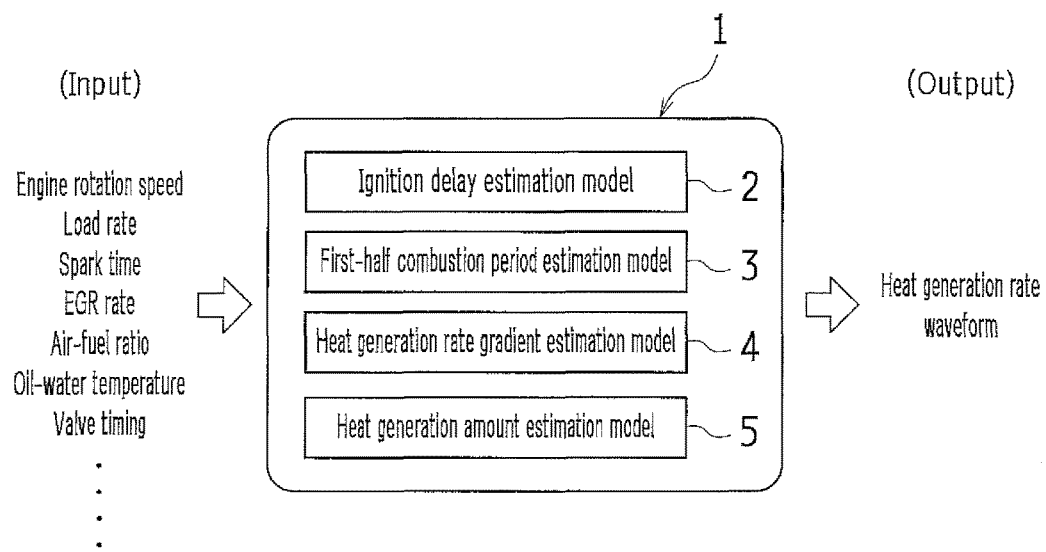
FIG. 1 is a diagram indicating a configuration of a heat generation rate waveform calculation device and its input/output information according to an embodiment.

FIG. 1 is a diagram indicating a configuration of a heat generation rate waveform calculation device 1 and its input/output information according to this embodiment. To the heat generation rate waveform calculation device 1, various pieces of information such as an engine state quantity, a control quantity of control parameters and a physical quantity are input. Examples of the above input information include an engine rotation speed, a load rate, a spark time, an EGR rate, an air-fuel ratio, an oil-water temperature, and an opening/closing timing (valve timing) of each intake/exhaust valve. Also, the heat generation rate waveform calculation device 1 estimates various characteristic values of a heat generation rate waveform based on each piece of input information, using estimation parts 2 to 5 in which respective estimation models are stored, and outputs the heat generation rate waveform produced using the various characteristic values.

—Estimation Part of Each Characteristic Value of Heat Generation Rate Waveform—

The heat generation rate waveform calculation device 1 includes: an ignition delay estimation part 2 that stores an ignition delay estimation model; a first-half combustion period estimation part 3 that stores a first-half combustion period estimation model; a heat generation rate gradient estimation part 4 that stores a heat generation rate gradient estimation model; and a heat generation amount estimation part 5 that stores a heat generation amount estimation model. The above estimation parts estimate, respectively, an ignition delay, a first-half combustion period, a heat generation rate gradient, and a heat generation amount as the characteristic values of the heat generation rate waveform.

The ignition delay estimation part 2 estimates a period (hereinafter referred to as "ignition delay period") from the time where an air-fuel mixture is sparked by an ignition plug of an engine (hereinafter referred to as "spark time", i.e., from the time where a spark discharge is performed between electrodes of the ignition plug) to the time where the air-fuel mixture is ignited by the spark and an initial flame kernel is formed (hereinafter referred to as "ignition time"), using the ignition delay estimation model. The ignition delay period is represented by a crank angle [CA]. In this embodiment, the ignition time is defined to be a time where the heat generation rate (heat generation amount per unit crank angle of the rotation of the crank shaft) reaches 1[J/CA] after the ignition time. The above value is not limited thereto and may be appropriately set. For example, the ignition time may be set to the time where the heat generation amount after the spark time reaches a predetermined rate (e.g., 5%) with respect to the total heat generation amount. Furthermore, the ignition time may be defined based on a time where the rate of the heat generation amount with respect to the total heat generation amount reaches a predetermined value (e.g., a crank angle position at the time where the rate reaches 10%) and a time where the rate of the heat generation amount reaches another predetermined value (e.g., a crank angle position at the time where the rate reaches 50%). That is, a triangle (triangular waveform) that is approximated to the heat generation rate waveform during increase of the heat generation rate is produced based on these crank angle positions and the rates of the heat generation amount, so that the ignition time is defined based on the triangular waveform. Also, the general shape of the heat generation rate waveform during increase of the heat generation rate may be applied to produce the heat generation rate waveform so that the above relationship between the crank angle position and the rate of the heat generation amount is established, thus, the ignition time may be defined based on the above heat generation rate waveform. The above respective values are not limited thereto, and may be appropriately set.

The first-half combustion period estimation part 3 estimates, in the combustion period of the air-fuel mixture, the first-half combustion period from the ignition time to a time where the heat generation rate is maximum according to growth of the flame kernel (i.e., a time where the heat generation rate is maximum within the period from the spark time to the combustion completion time), using the first-half combustion period estimation model. Hereinafter, the time where the heat generation rate is maximum is referred to as "heat generation rate maximum time". The heat generation rate maximum time and the first-half combustion period are respectively represented by the crank angle [CA].

The heat generation rate gradient estimation part 4 estimates an average increase rate of the heat generation rate (heat generation rate gradient) relative to changes in the crank angle in the first-half combustion period, i.e., the period from the ignition time to the heat generation rate maximum time, using the heat generation rate gradient estimation model. In this embodiment, as described below with reference to FIG. 2, the triangular waveform approximated to the heat generation rate waveform is produced. The heat generation rate gradient estimation part 4 is to estimate a gradient of the oblique side that represents the heat generation rate from the ignition time to the heat generation rate maximum time in the triangular waveform. The unit of the gradient of the heat generation rate is represented by $[J/CA^2]$.

The heat generation amount estimation part 5 estimates the heat generation amount generated by combustion of the air-fuel mixture (i.e., heat generation amount generated throughout the entire combustion period, which is an integrated value of the heat generation rate in the period from the spark time to the combustion completion time) using the heat generation amount estimation model. The unit of the heat generation amount is represented by [J].

By respective estimation operations in the estimation parts 2 to 5, the characteristic values of the heat generation rate waveform, i.e., the ignition delay, the first-half combustion period, the heat generation rate gradient and the heat generation amount are obtained. Then, the heat generation rate waveform is produced using these characteristic values.

Thus produced heat generation rate waveform is the output of the heat generation rate waveform calculation device 1.

Figure 3:
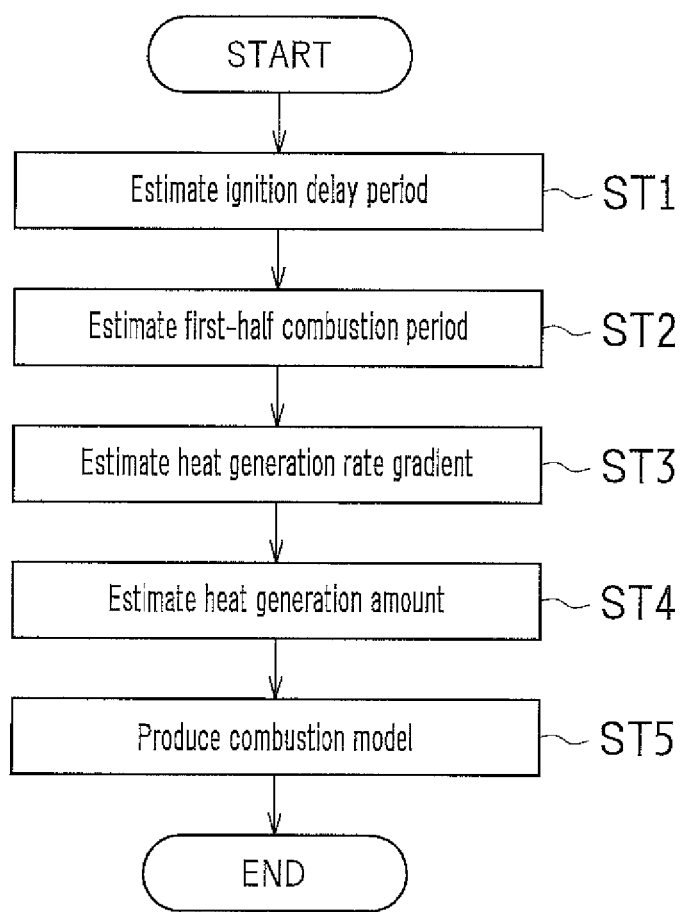
FIG. 3 is a flowchart indicating steps of producing the heat generation rate waveform performed by the heat generation rate waveform calculation device.

Thus, in the heat generation rate waveform calculation device 1 according to this embodiment, as shown in the flowchart of FIG. 3, the following steps are sequentially performed: an operation to estimate the ignition delay period by the ignition delay estimation part 2 (step ST1); an operation to estimate the first-half combustion period by the first-half combustion period estimation part 3 (step ST2); an operation to estimate heat generation rate gradient by the heat generation rate gradient estimation part 4 (step ST3); and an operation to estimate the heat generation amount by the heat generation amount estimation part 5 (step ST4). Then, an operation to produce the heat generation rate waveform using the estimated characteristic values is performed (step ST5).

Figure 2:
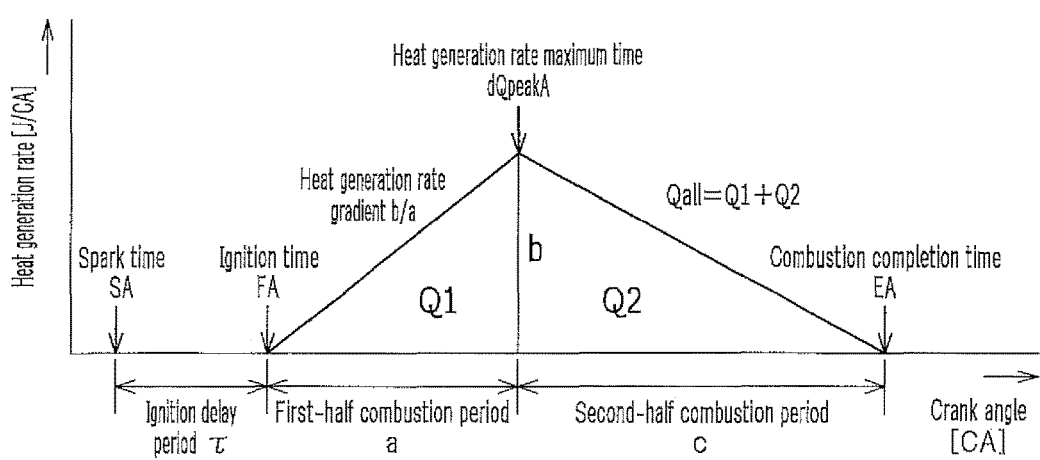
FIG. 2 is a graph indicating one example of a heat generation rate waveform that is output from the heat generation rate waveform calculation device.

FIG. 2 indicates one example of the heat generation rate waveform that is produced using the characteristic values estimated by the estimation parts 2 to 5 and that is output from the heat generation rate waveform calculation device 1. In FIG. 2, the time SA represents the spark time, and the time FA represents the ignition time. Therefore, the period $\tau$ in the graph represents the ignition delay period. Also, the time dQpeakA represents the heat generation rate maximum time, and the heat generation rate at the heat generation rate maximum time dQpeakA is represented by b in the graph. That is, the heat generation rate b represents the maximum heat generation rate in the combustion period. Also, the period a from the ignition time FA to the heat generation rate maximum time dQpeakA represents the first-half combustion period. Thus, the gradient of the heat generation rate in the first-half combustion period a is represented by b/a. Furthermore, the period c from the heat generation rate maximum time dQpeakA to the combustion completion time EA represents a second-half combustion period. In the graph, Q1 represents the heat generation amount in the first-half combustion period a, and Q2 represents the heat generation amount in the second-half combustion period c. Thus, the heat generation amount (total heat generation amount $Q_{all}$) generated throughout the entire combustion period is represented as a sum of the heat generation amount Q1 and the heat generation amount Q2.

In other words, the heat generation rate waveform calculation device 1 of this embodiment approximates the heat generation rate waveform by the triangular waveform with the crank angle period from the ignition of the air-fuel mixture to the combustion completion (i.e., from FA to EA in the graph) as a base and the heat generation rate b at the heat generation rate maximum time dQpeakA as an apex. In this embodiment, the system, control and adaptive values are reviewed when designing an engine, using the heat generation rate waveform that is output from the heat generation rate waveform calculation device 1.

Hereinafter, estimation processing in each of the estimation parts 2 to 5 will be specifically described.

—Ignition Delay Estimation Part—

As described above, the ignition delay estimation part 2 estimates the ignition delay period $\tau$ from the spark time SA to the ignition time FA.

The processing for estimating the ignition delay period $\tau$ is performed by the ignition delay estimation part 2 as described below.

The ignition delay period $\tau$ is estimated using either of the following estimations (1) and (2) (i.e., these expressions correspond to the ignition delay estimation model).

[Expression 1]

$$\tau = C_1 \times \rho_{fuel@SA}{}^\chi \times Ne^\delta \quad (1)$$

[Expression 2]

$$\tau = C_2 \times \rho_{fuel@FA}{}^\varphi \times Ne^\Psi \quad (2)$$

In the above expressions, $\rho_{fuel@SA}$ represents an in-cylinder fuel density at the spark time SA (i.e., in-cylinder fuel amount [mol]/in-cylinder volume [L] at spark time), while $\rho_{fuel@FA}$ represents an in-cylinder fuel density at the ignition time FA (i.e., in-cylinder fuel amount [mol]/in-cylinder volume [L] at ignition time). Ne represents the engine rotation speed. $C_1$, $C_2$, $\chi$, $\delta$, $\varphi$, $\Psi$ represent coefficients respectively identified by experiments and the like.

The above expressions (1) and (2) hold under the condition that the air-fuel ratio is the theoretical air-fuel ratio, the EGR rate equals zero, the warming-up operation of the engine is finished (i.e., the oil-water temperature is a predetermined value or more), and the opening/closing timing of each intake/exhaust valve is fixed.

The expression (1) is to calculate the ignition delay period $\tau$ when the air-fuel mixture is ignited on an advance side (BTDC) of the time where the piston reaches the compression top dead center (TDC) (hereinafter referred to as "BTDC ignition"). The expression (2) is to calculate the ignition delay period $\tau$ when the air-fuel mixture is ignited on a delay side (ATDC) of the time where the piston reaches the compression top dead center (TDC) (hereinafter referred to as "ATDC ignition").

As shown in the expressions, the ignition delay period $\tau$ is calculated by the arithmetic expression with the in-cylinder fuel density $\rho_{fuel}$ at a predetermined time and the engine rotation speed Ne as variables.

The reason why the ignition delay period $\tau$ can be calculated by the above arithmetic expressions will be described below.

Figure 4:
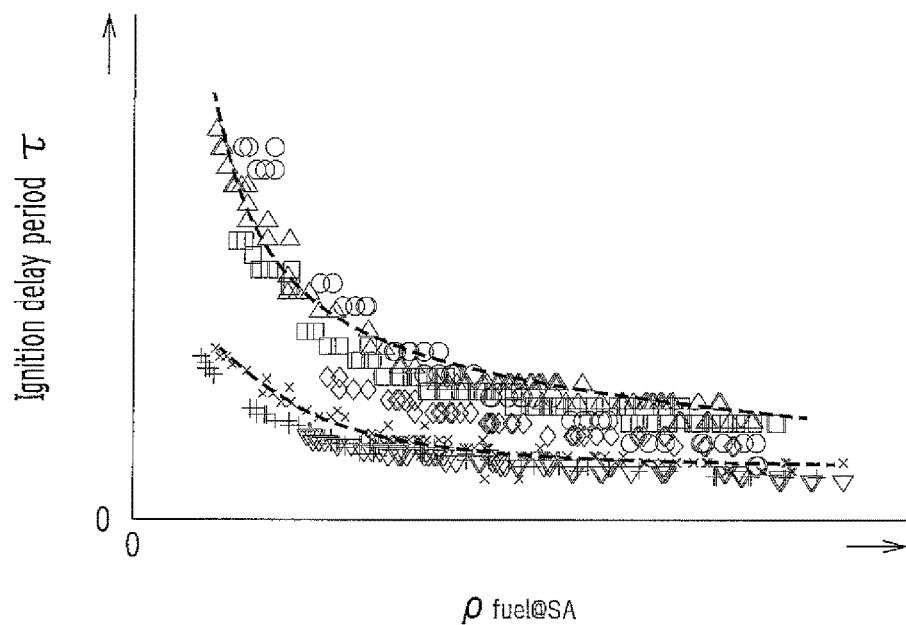
FIG. 4 is a graph indicating measured results, by experiments, of changes in an ignition delay period τ relative to changes in an in-cylinder fuel density $\rho_{fuel@SA}$ at a spark time SA in the case of ignition before the compression top dead center (hereinafter referred to as "BTDC ignition").

FIG. 4 is a graph indicating measured results, by experiments, of changes in the ignition delay period $\tau$ relative to changes in the in-cylinder fuel density $\rho_{fuel@SA}$ at the spark time SA in the case of the BTDC ignition. These experiments were performed under the condition that the air-fuel ratio was the theoretical air-fuel ratio, the EGR rate equaled zero, the warming-up operation of the engine was finished (i.e., the oil-water temperature was the predetermined value or more), and the opening/closing timing of each intake/exhaust valve was fixed. Also, in FIG. 4, the engine rotation speed Ne increases in the following order: "○"; "Δ"; "□"; "◇"; "x"; "+"; and "∇". For example, "○" represents 800 rpm, "Δ" represents 1000 rpm, "□" represents 1200 rpm, "◇" represents 1600 rpm, "x" represents 2400 rpm, "+" represents 3200 rpm and "∇" represents 3600 rpm.

As shown in FIG. 4, in the case of the BTDC ignition, the in-cylinder fuel density $\rho_{fuel@SA}$ at the spark time SA is correlated with the ignition delay period $\tau$ for each engine rotation speed Ne. That is, each correlation can substantially be expressed by a corresponding curve. In FIG. 4, for each case in which the engine rotation speed Ne is 1000 rpm and 2400 rpm, the corresponding correlation between the in-cylinder fuel density $\rho_{fuel@SA}$ at the spark time SA and the ignition delay period $\tau$ is expressed by one curve.

As shown in FIG. 4, as the in-cylinder fuel density $\rho_{fuel@SA}$ at the spark time SA increases, the ignition delay period $\tau$ decreases. This is probably due to the fact that as the fuel density $\rho_{fuel@SA}$ increases, the number of fuel molecules around the ignition plug increases, which results in rapid growth of the flame kernel after the ignition plug sparks.

Also, the engine rotation speed Ne affects the ignition delay period τ. That is, as the engine rotation speed Ne increases, the ignition delay period τ decreases. This is probably due to the fact that as the engine rotation speed Ne increases, a turbulence in flow of the air-fuel mixture (hereinafter simply referred to as "turbulence") in the cylinder increases, which results in rapid growth of the flame kernel. Thus, the in-cylinder fuel density $\rho_{fuel@SA}$ at the spark time SA and the engine rotation speed Ne are parameters that affect the ignition delay period τ.

Figure 5:
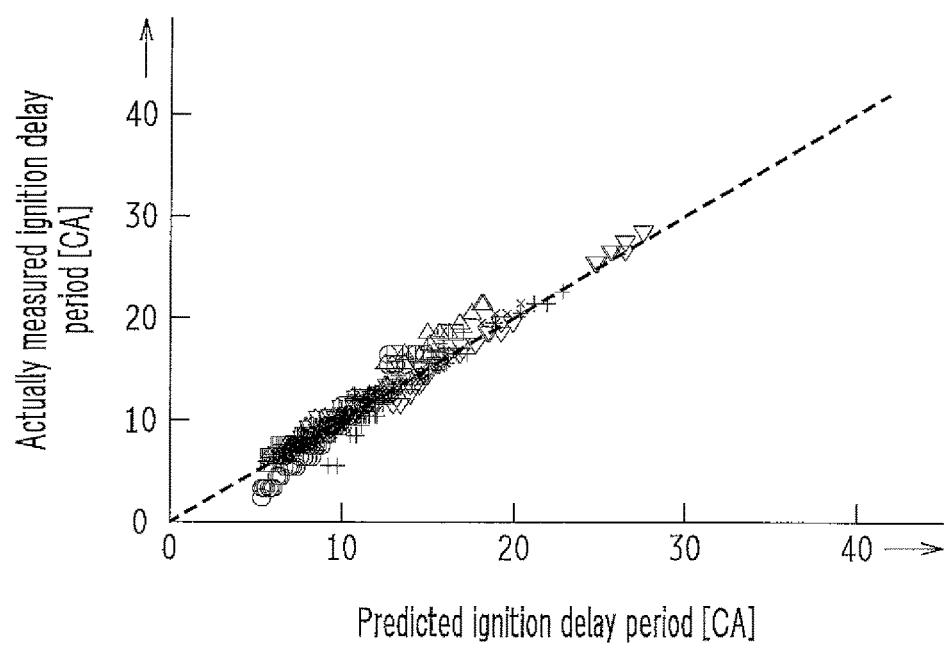
FIG. 5 is a graph indicating results obtained by verifying the relationship between a predicted ignition delay period calculated by an expression (1) and an actually measured ignition delay period measured by an actual machine.

FIG. 5 is a graph indicating results obtained by verifying the relationship between a predicted ignition delay period calculated by the expression (1) and an actually measured ignition delay period measured by an actual machine. In order to obtain the predicted ignition delay period, a prediction expression is used, which is obtained by identifying each coefficient $C_1$, χ, and δ in the expression (1) according to each engine operation condition. In FIG. 5, the engine rotation speed Ne increases in the following order: "○"; "Δ"; "□"; "◇"; "x"; "+"; "∇"; and "☆". For example, "○" represents 800 rpm, "Δ" represents 1000 rpm, "□" represents 1200 rpm, "◇" represents 1600 rpm, "x" represents 2000 rpm, "+" represents 2400 rpm, "∇" represents 3200 rpm and "☆" represents 3600 rpm.

As clearly shown in FIG. 5, the predicted ignition delay period substantially coincides with the actually measured ignition delay period. Thus, it can be clearly seen that the ignition delay period in the case of the BTDC ignition is calculated with a high accuracy by the expression (1).

Figure 6:
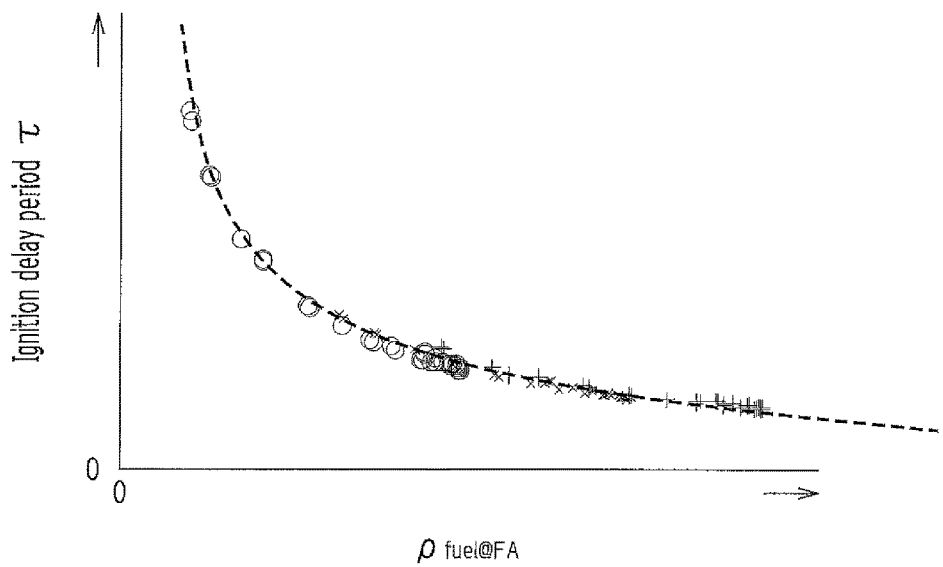
FIG. 6 is a graph indicating measured results, by experiments, of changes in the ignition delay period z relative to changes in the in-cylinder fuel density $\rho_{fuel@FA}$ at an ignition time FA in the case of ignition after the compression top dead center (hereinafter referred to as "ATDC ignition").

FIG. 6 is a graph indicating measured results, by experiments, of changes in the ignition delay period τ relative to changes in the in-cylinder fuel density $\rho_{fuel@FA}$ at the ignition time FA in the case of the ATDC ignition. These experiments were performed under the condition that the engine rotation speed was fixed, the air-fuel ratio was the theoretical air-fuel ratio, the EGR rate equaled zero, the warming-up operation of the engine was finished (i.e., the oil-water temperature was the predetermined value or more), and the opening/closing timing of each intake/exhaust valve was fixed. Also, in FIG. 6, the load rate increases in the following order: "○"; "x"; "+"; and "Δ". For example, "○" represents 20% load rate, "x" represents 30% load rate, "+" represents 40% load rate and "Δ" represents 50% load rate.

As shown in FIG. 6, in the case of the ATDC ignition, the in-cylinder fuel density $\rho_{fuel@FA}$ at the ignition time FA is correlated with the ignition delay period τ regardless of the load rate (irrespective of the load rate). That is, the correlation can substantially be expressed by one curve.

As shown in FIG. 6, as the in-cylinder fuel density $\rho_{fuel@FA}$ at the ignition time FA increases, the ignition delay period τ decreases. As described above, this is probably due to the fact that as the fuel density $\rho_{fuel@FA}$ increases, the number of fuel molecules around the ignition plug increases, which results in rapid growth of the flame kernel after the ignition plug sparks. Thus, the in-cylinder fuel density $\rho_{fuel@FA}$ at the ignition time FA is a parameter that affects the ignition delay period τ. Also, similarly to the above, the engine rotation speed Ne is considered to be a parameter that affects the ignition delay period τ.

Figure 7:
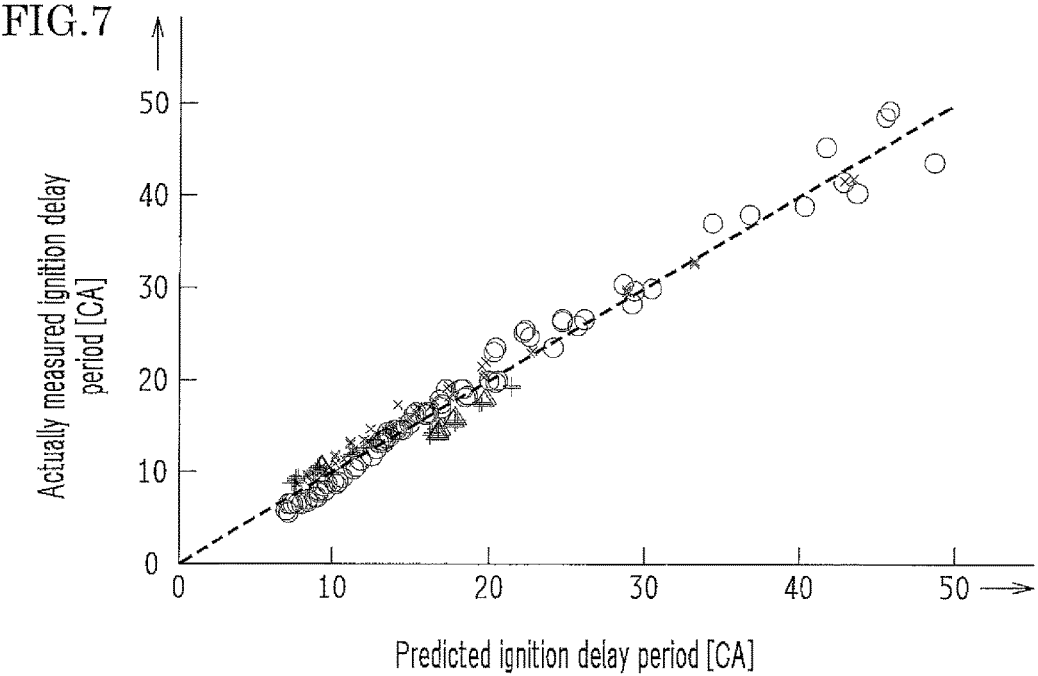
FIG. 7 is a graph indicating results obtained by verifying the relationship between a predicted ignition delay period calculated by an expression (2) and an actually measured ignition delay period measured by an actual machine.

FIG. 7 is a graph indicating results obtained by verifying the relationship between the predicted ignition delay period calculated by the expression (2) and the actually measured ignition delay period measured by an actual machine. In order to obtain the predicted ignition delay period, a prediction expression is used, which is obtained by identifying each coefficient $C_2$, φ, and Ψ in the expression (2) according to each engine operation condition. In FIG. 7, the engine rotation speed Ne increases in the following order: "○"; "x"; "+"; and "Δ". For example, "○" represents 800 rpm, "x" represents 1200 rpm, "+" represents 3600 rpm and "Δ" represents 4800 rpm.

As clearly shown in FIG. 7, the predicted ignition delay period substantially coincides with the actually measured ignition delay period. Thus, it can be clearly seen that the ignition delay period in the case of the ATDC ignition is calculated with a high accuracy by the expression (2).

From the above-described new knowledge, the inventor of the present invention derived the above expressions (1) and (2).

Hereinafter, the reason why the ignition delay period τ is calculated by being classified according to the ignition time will be described. That is, the reason why the BTDC ignition and the ATDC ignition are classified to calculate the respective ignition delay periods τ using the different arithmetic expressions (the above expressions (1) and (2)).

Figure 8:
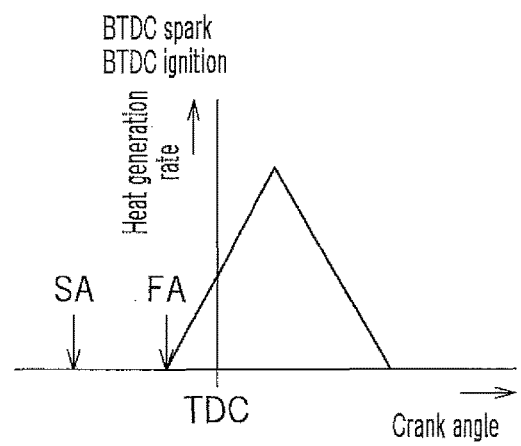
FIG. 8 is a graph indicating the spark time SA and the heat generation rate waveform in the BTDC ignition.

First, in the case of the BTDC ignition, the spark time SA is also on the advance side (BTDC) of the time where the piston reaches the compression top dead center, as shown in FIG. 8 (Figure indicating the spark time SA and the heat generation rate waveform). In this case, after the spark time SA passes, the piston moves toward the compression top dead center. Thus, the in-cylinder volume decreases, which results in the fuel density $\rho_{fuel}$ increasing. For this reason, regarding the fuel density $\rho_{fuel}$, the fuel density $\rho_{fuel@SA}$ at the spark time SA is smaller than the fuel density $\rho_{fuel@FA}$ at the ignition time FA. Thus, it is possible to obtain the ignition delay period τ with a high accuracy by multiplying the fuel density $\rho_{fuel@SA}$ at the spark time SA, which is correlated with the maximum value of the ignition delay period (the longest predicted ignition delay period), by the various coefficients previously identified.

Figure 9:
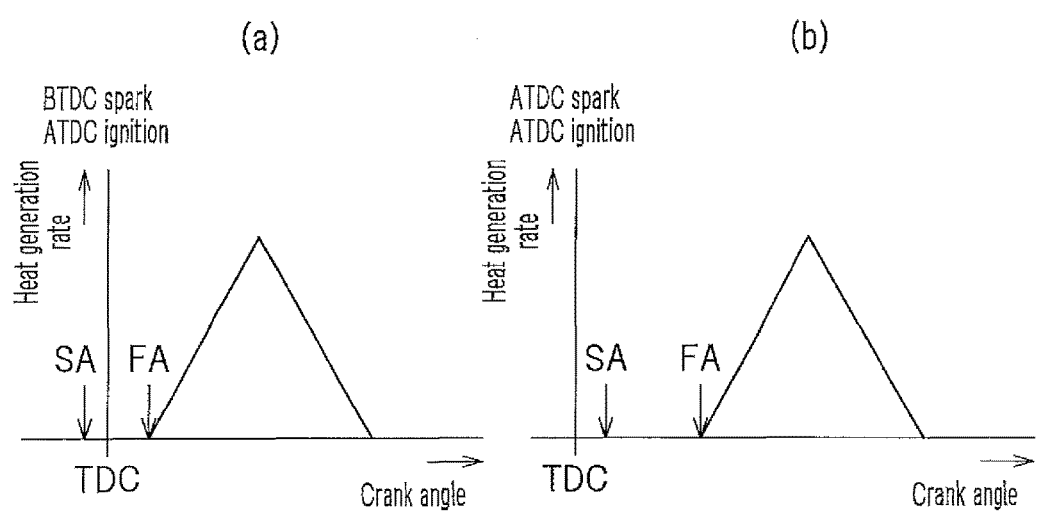
FIG. 9 are graphs indicating the spark time SA and the heat generation rate waveform in the ATDC ignition.

On the other hand, in the case of the ATDC ignition, the spark time SA is on the advance side (BTDC) of the time where the piston reaches the compression top dead center (see FIG. 9(a)) or on the delay side (ATDC) (see FIG. 9(b)), as shown in FIG. 9 (Figures indicating the spark time SA and the heat generation rate waveform). In these cases, after the ignition time FA passes, the piston moves toward the compression bottom dead center. Thus, the in-cylinder volume increases, which results in the fuel density $\rho_{fuel}$ decreasing. For this reason, regarding the fuel density $\rho_{fuel}$, the fuel density $\rho_{fuel@FA}$ at the ignition time FA is likely to be smaller than the fuel density $\rho_{fuel@SA}$ at the spark time SA. Thus, it is possible to obtain the ignition delay period τ with a high accuracy by multiplying the fuel density $\rho_{fuel@FA}$ at the ignition time FA, which is correlated with the maximum value of the ignition delay period (the longest predicted ignition delay period), by the various coefficients previously identified.

Also, the steps of determining which expression out of the expressions (1) and (2) is used (i.e., steps of determining into which the ignition time falls, the BTDC ignition or the ATDC ignition), and the steps of calculating the ignition delay period (true ignition delay period, described later) are described as follows. A virtual ignition time is set so as to obtain the in-cylinder volume at the virtual ignition time. Since the in-cylinder volume can be geometrically obtained from the crank angle position (piston position) corresponding to the virtual ignition time, the in-cylinder volume is uniquely determined upon the virtual ignition time. Then, the fuel density is obtained from the in-cylinder volume and the fuel injection amount. When the virtual ignition time is set as the BTDC ignition, the fuel density and the engine rotation speed at the virtual ignition time are substituted into the expression (1) so as to calculate an estimated ignition delay period. On the other hand, when the virtual ignition time is set as the ATDC ignition, the fuel density and the engine rotation speed at the virtual ignition time are substituted into the expression (2) so as to calculate the estimated ignition delay period. Thus, the time that is advanced by the above-calculated estimated ignition delay period is set as a virtual spark time relative to the virtual ignition time. Here, the virtual spark time is compared with the actual spark time (spark time as the input information). When the virtual spark time does not coincide with the actual spark time, the virtual ignition time is changed. For example, the virtual ignition time is changed to the delay side. Then, the fuel density and the engine rotation speed at the virtual ignition time are substituted into the expression (1) or (2) (i.e., when the virtual ignition time is set as the BTDC ignition, the above values are substituted into the expression (1), while the virtual ignition time is set as the ATDC ignition, the above values are substituted into the expression (2)), so that the estimated ignition delay period is calculated. Thus, the virtual spark time is obtained, and compared with the actual spark time (spark time as the input information). The above proceeding is repeatedly performed, and the virtual ignition time in the case that the virtual spark time coincides with the actual spark time can be obtained as the true ignition time. At the same time (where the true ignition time is obtained), the estimated ignition delay period calculated by the expression (1) or (2) can also be obtained as the true ignition delay period. When the true ignition time is BTDC (BTDC ignition), the obtained ignition time may be once again substituted into the expression (1) so as to calculate the ignition delay period $\tau$. When the true ignition time is ATDC (ATDC ignition), the obtained ignition time may be once again substituted into the expression (2) so as to calculate the ignition delay period $\tau$.

The above steps can also be described as follows. The period between the actual spark time and the virtual ignition time (i.e., virtual ignition delay period in the case of the ignition at the virtual ignition time) is compared with the estimated ignition delay period calculated (estimated) by the expression (1) or (2). When the above periods do not coincide with each other, the virtual ignition time is changed. After the estimated ignition delay period is calculated once again by the expression (1) or (2), the period between the actual spark time and the virtual ignition time (i.e., virtual ignition delay period) is compared with the estimated ignition delay period calculated by the expression (1) or (2). The above proceeding is repeatedly performed, thus the estimated ignition delay period in the case that the two periods coincide with each other (i.e., the virtual ignition delay period coincides with the estimated ignition delay period) is obtained as the true ignition delay period.

Thus, by estimating the ignition delay period $\tau$ by the ignition delay estimation part 2, it is possible to estimate the ignition delay period $\tau$ over the entire operation range of the engine.

When the ignition delay period $\tau$ is obtained as described above, it is possible to obtain the ignition time FA by adding the ignition delay period $\tau$ to the spark time SA.

—First-Half Combustion Period Estimation Part—

As described above, the first-half combustion period estimation part 3 estimates the first-half combustion period a from the ignition time FA to the heat generation rate maximum time dQpeakA.

The processing for estimating the first-half combustion period a is performed by the first-half combustion period estimation part 3 as described below.

The first-half combustion period a [CA] is estimated using the following expression (3) (i.e., the expression corresponds to the first-half combustion period estimation model).

[Expression 3]

$$a = C \times V_{@dQpeak}{}^{\alpha} \times Ne^{\beta} \tag{3}$$

In the above expression, $V_{@dQpeak}$ represents the in-cylinder volume [L] at the heat generation rate maximum time dQpeakA, which is also referred to as "in-cylinder volume at heat generation rate maximum time" hereinafter. Ne represents the engine rotation speed. C, $\alpha$ and $\beta$ represent coefficients respectively identified by experiments and the like.

The above expression (3) holds under the condition that the opening/closing timing of the intake valve is fixed. Also, the above expression (3) holds without being affected by the load rate, the EGR rate, the air-fuel ratio and the oil-water temperature. That is, the expression (3) holds based on the fact that the first-half combustion period a is not affected by the load rate, the EGR rate, the air-fuel ratio and the oil-water temperature.

The reason why the first-half combustion period a can be calculated by the above expression (3) will be described below.

Figure 10:
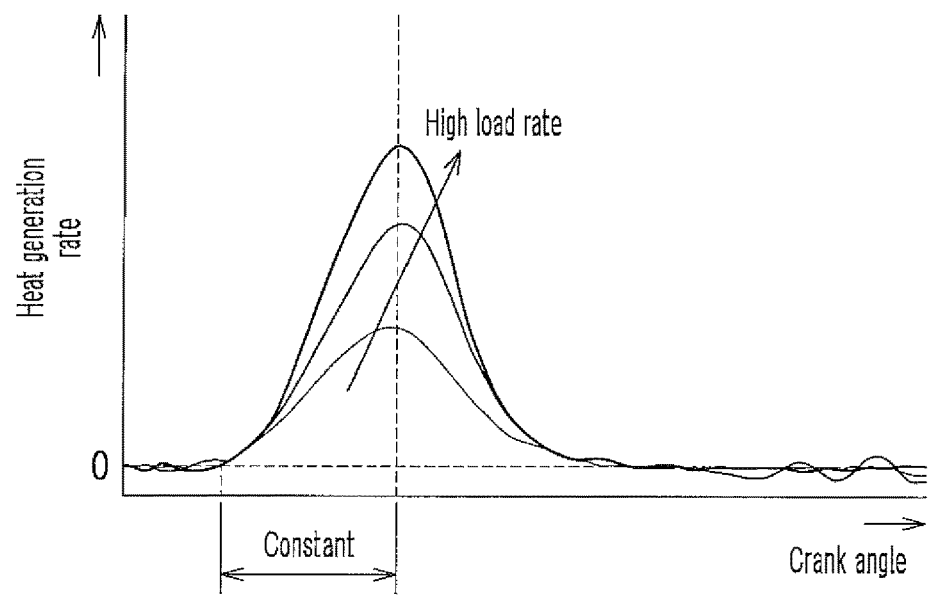
FIG. 10 is a graph indicating the heat generation rate waveforms obtained in respective engine operation states that differ from one another only in the load rate, by adjusting each spark time SA so that respective heat generation rate maximum times dQpeakA match with one another, the heat generation rate waveforms being indicated in a manner overlapping with one another.
Figure 11:
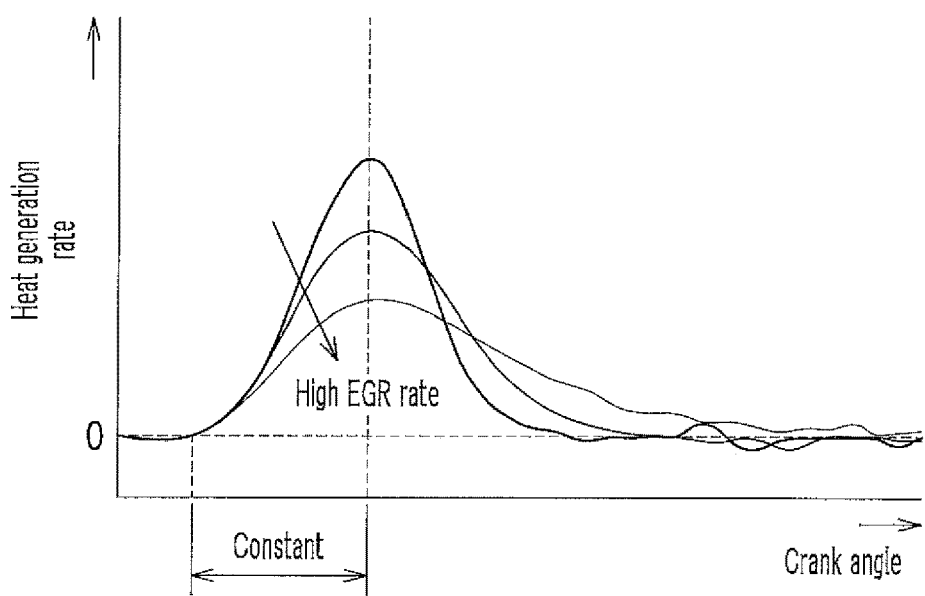
FIG. 11 is a graph indicating the heat generation rate waveforms obtained in respective engine operation states that differ from one another only in the exhaust gas recirculation (EGR) rate, by adjusting each spark time SA so that the respective heat generation rate maximum times dQpeakA match with one another, the heat generation rate waveforms being indicated in a manner overlapping with one another.
Figure 12:
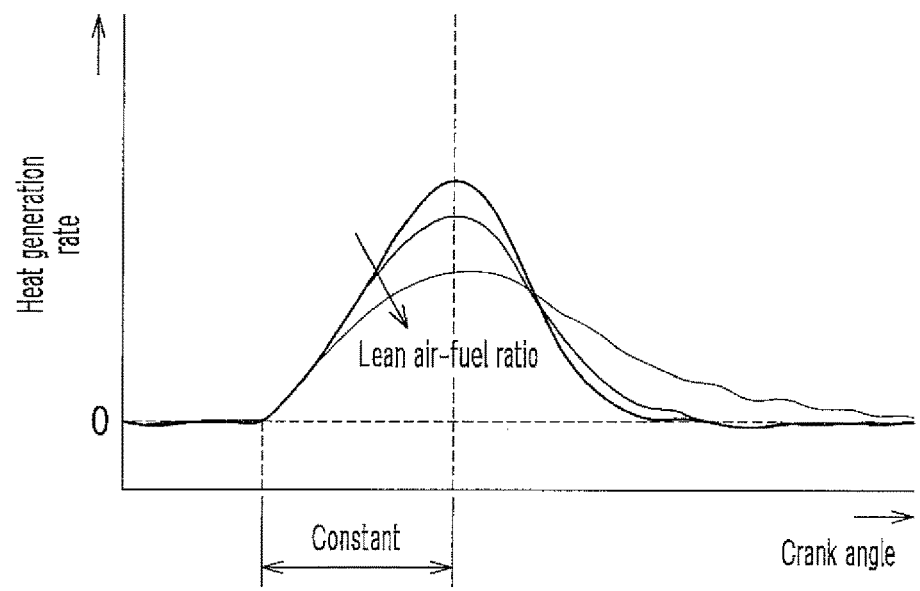
FIG. 12 is a graph indicating the heat generation rate waveforms obtained in respective engine operation states that differ from one another only in the air-fuel ratio, by adjusting each spark time SA so that the respective heat generation rate maximum times dQpeakA match with one another, the heat generation rate waveforms being indicated in a manner overlapping with one another.

FIGS. 10 to 13 are graphs indicating the heat generation rate waveforms obtained in respective engine operation states that differ from one another, by adjusting each spark time SA so that the respective heat generation rate maximum times dQpeakA match with one another, the heat generation rate waveforms being indicated in a manner overlapping with one another. FIG. 10 indicates, in an overlapping manner, the heat generation rate waveforms obtained in the respective engine operation states that differ from one another only in the load rate. FIG. 11 indicates, in an overlapping manner, the heat generation rate waveforms obtained in the respective engine operation states that differ from one another only in the EGR rate. FIG. 12 indicates, in an overlapping manner, the heat generation rate waveforms obtained in the respective engine operation states that differ from one another only in the air-fuel ratio. Also, FIG. 13 indicates, in an overlapping manner, the heat generation rate waveforms obtained in the respective engine operation states that differ from one another only in the oil-water temperature during, for example, the warming-up operation of the engine.

As shown in FIGS. 10 to 13, the first-half combustion period a is maintained to be constant regardless of any changes in the load rate, the EGR rate, the air-fuel ratio and the oil-water temperature. Thus, it can be seen that the first-half combustion period a is not affected by the load rate, the EGR rate, the air-fuel ratio and the oil-water temperature.

Figure 14:
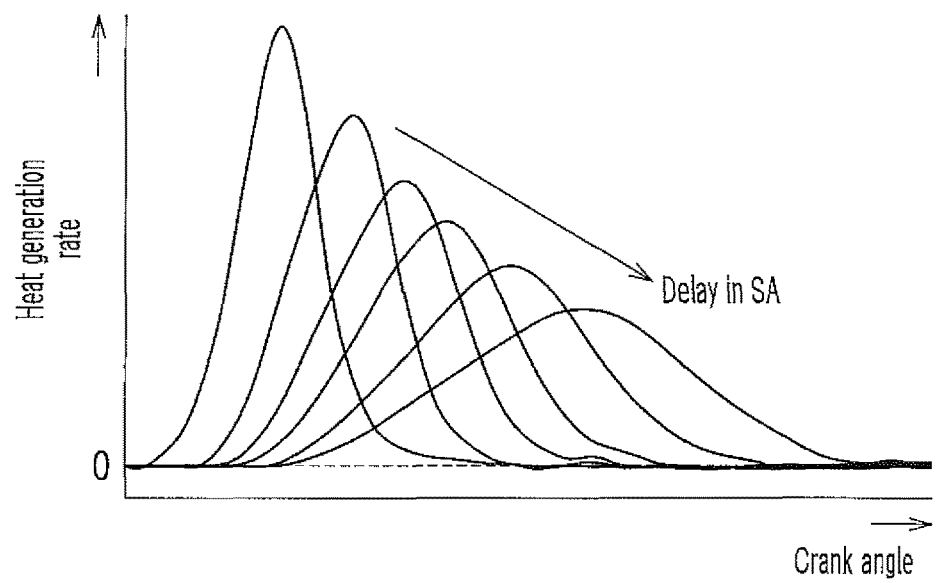
FIG. 14 is a graph indicating the heat generation rate waveforms obtained in the respective engine operation states that differ from one another in the spark time SA, the heat generation rate waveforms being indicated in a manner overlapping with one another.

In contrast, FIG. 14 is a graph indicating, in an overlapping manner, the heat generation rate waveforms obtained in the respective engine operation states that differ from one another in the spark time SA. As can be seen from FIG. 14, as the spark time SA is delayed, the first-half combustion period a increases.

Figure 15:
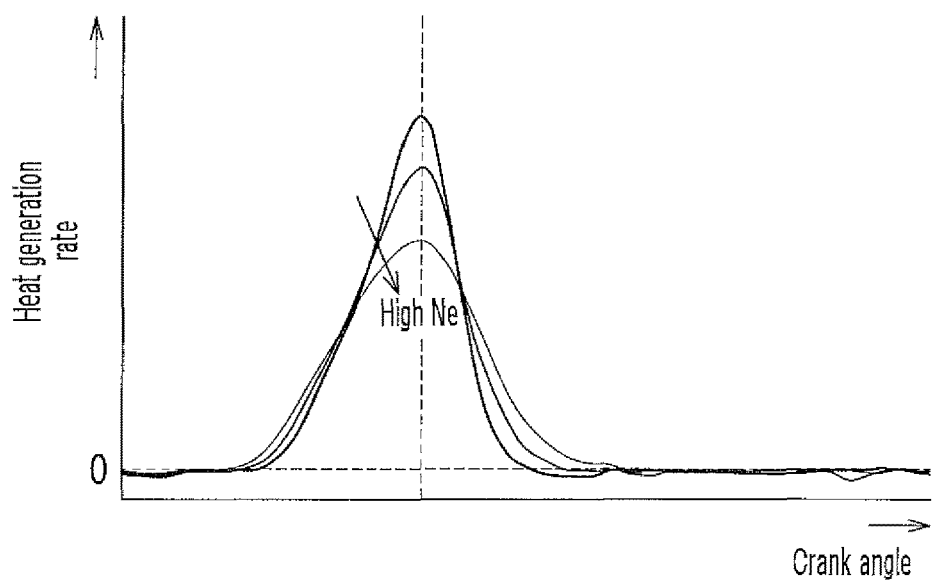
FIG. 15 is a graph indicating the heat generation rate waveforms obtained in the respective engine operation states that differ from one another only in the engine rotation speed Ne, by adjusting each spark time SA so that the respective heat generation rate maximum times dQpeakA match with one another, the heat generation rate waveforms being indicated in a manner overlapping with one another.

FIG. 15 is a graph indicating the heat generation rate waveforms obtained in the respective engine operation states that differ from one another only in the engine rotation speed Ne, by adjusting each spark time SA so that the respective heat generation rate maximum times dQpeakA match with one another, the heat generation rate waveforms being indicated in a manner overlapping with one another. As the engine rotation speed Ne increases, the crank rotation angle [CA] per unit time [ms] increases, which would lead to increase (on the axis of the crank angle) of the first-half combustion period a. However, in FIG. 15, the first-half combustion period a is almost unchanged although the engine rotation speed Ne changes. It is considered that there is any factor that shortens the first-half combustion period a as the engine rotation speed Ne increases. That is, apart from the increase of the first-half combustion period a caused by the fact that the crank rotation angle per unit time increases as the engine rotation speed Ne increases, there should be "another factor" that shortens the first-half combustion period a.

Thus, it can be seen that the first-half combustion period a is affected by the spark time SA and the engine rotation speed Ne.

The reason why the first-half combustion period a is affected by the spark time SA and the engine rotation speed Ne is considered to be influence of the spark time SA and the engine rotation speed Ne on the turbulence in the cylinder.

That is, as the spark time SA is shifted to the delay side, the ignition time FA and the heat generation rate maximum time dQpeakA are shifted to the delay side. Thus, the in-cylinder volume at the heat generation rate maximum time dQpeakA (i.e., in-cylinder volume $V_{@dQpeak}$ at heat generation rate maximum time) increases while the turbulence in the cylinder reduces. When the turbulence in the cylinder reduces, the flame propagates more slowly, which results in increase in the first-half combustion period a. On the other hand, as the spark time SA is shifted to the advance side, the ignition time FA and the heat generation rate maximum time dQpeakA are shifted to the advance side. Thus, the in-cylinder volume $V_{@dQpeak}$ at heat generation rate maximum time reduces while the turbulence in the cylinder increases, which results in rapid flame propagation. Thus, the first-half combustion period a decreases.

Also, as the engine rotation speed Ne decreases, the flow rate of the air that flows from the intake system into the cylinder decreases, which leads to reduction in the turbulence in the cylinder. When the turbulence in the cylinder reduces, the flame propagates more slowly, which results in increase in the first-half combustion period a. On the other hand, as the engine rotation speed Ne increases, the flow rate of the air that flows from the intake system into the cylinder increases, which leads to increase in the turbulence in the cylinder. When the turbulence in the cylinder increases, the flame propagates more rapidly, which results in decrease in the first-half combustion period a. The above-mentioned "another factor (that shortens the first-half combustion period a)" means the rapid flame propagation caused by the fact that as the engine rotation speed Ne increases, the turbulence in the cylinder increases.

From the above-described new knowledge, the inventor of the present invention derived the above expression (3). In the expression (3), the in-cylinder volume, in particular the in-cylinder volume $V_{@dQpeak}$ at heat generation rate maximum time, which is a physical quantity correlated with the spark time SA that is a control quantity, is used as a variable. That is, as described above, as the spark time SA is shifted to the delay side, the heat generation rate maximum time dQpeakA is shifted to the delay side, which leads to increase in the in-cylinder volume $V_{@dQpeak}$. Therefore, the in-cylinder volume $V_{@dQpeak}$ at heat generation rate maximum time, which is a physical quantity correlated with the spark time SA, is used as a variable.

The steps of obtaining the in-cylinder volume $V_{@dQpeak}$ at heat generation rate maximum time, which is the variable in the expression (3), and the steps of calculating the first-half combustion period a are described as follows. A virtual heat generation rate maximum time is set so as to obtain the in-cylinder volume at the virtual heat generation rate maximum time. Since the in-cylinder volume can be geometrically obtained from the crank angle position (piston position) corresponding to the virtual heat generation rate maximum time, the in-cylinder volume is uniquely determined upon the virtual heat generation rate maximum time. Then, an estimated first-half combustion period is calculated by substituting the in-cylinder volume and the engine rotation speed at the virtual heat generation rate maximum time into the expression (3). Thus, the time that is advanced by the above-calculated estimated first-half combustion period is set as a virtual ignition time relative to the virtual heat generation rate maximum time. Since the above-described ignition delay estimation part 2 calculates the ignition delay period τ, the ignition time FA can be calculated by adding the ignition delay period τ to the spark time SA. Here, the virtual ignition time is compared with the calculated ignition time FA. When the virtual ignition time does not coincide with the calculated ignition time FA, the virtual heat generation rate maximum time is changed. For example, the virtual heat generation rate maximum time is changed to the delay side. Then, the in-cylinder volume and the engine rotation speed at the virtual heat generation rate maximum time are substituted into the expression (3) so that the estimated first-half combustion period is calculated. Thus, the virtual ignition time is obtained, and compared with the calculated ignition time FA (obtained by adding, to the spark time SA, the ignition delay period τ calculated by the ignition delay estimation part 2). The above proceeding is repeatedly performed, and the virtual heat generation rate maximum time in the case that the virtual ignition time coincides with the calculated ignition time FA can be obtained as the true heat generation rate maximum time dQpeakA. At the same time (where the true heat generation rate maximum time dQpeakA is obtained), the estimated first-half combustion period calculated by the expression (3) can also be obtained as the true first-half combustion period. Also, the in-cylinder volume $V_{@dQpeak}$ at the true heat generation rate maximum time dQpeakA may be geometrically obtained and substituted into the expression (3) once again so as to calculate the first-half combustion period a.

The above steps can also be described as follows. The period between the ignition time FA (ignition time obtained based on the actual ignition time) and the virtual heat generation rate maximum time (i.e., the virtual first-half combustion period) is compared with the estimated first-half combustion period calculated (estimated) by the expression (3) (i.e., the estimated first-half combustion period based on the physical quantity at the virtual heat generation rate maximum time). When the above periods do not coincide with each other, the virtual heat generation rate maximum time is changed. After the estimated first-half combustion period is calculated once again by the expression (3), the period between the ignition time FA and the virtual heat generation rate maximum time (i.e., virtual first-half combustion period) is compared with the estimated first-half combustion period calculated by the expression (3). The above proceeding is repeatedly performed, thus the estimated first-half combustion period in the case that the two periods coincide with each other (i.e., the virtual first-half combustion period coincides with the estimated first-half combustion period) is obtained as the true first-half combustion period a.

The respective coefficients in the expression (3) are specifically described. C and α are identified based on experiments and the like. β is a value depending on the tumble ratio in the cylinder, which increases as the tumble ratio increases. The respective coefficients may be set as the identified values based on experiments and the like. Also, these coefficients may be identified according to changes in the opening/closing timing of the intake valve.

Figure 16:
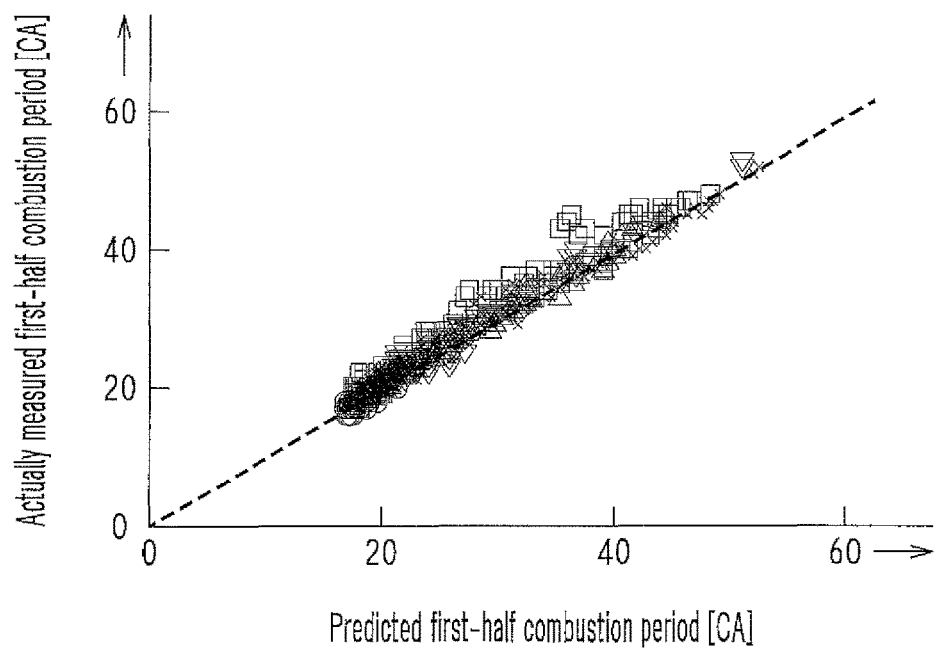
FIG. 16 is a graph indicating results obtained by verifying the relationship, in an engine, between a predicted first-half combustion period calculated by an expression (3) and an actually measured first-half combustion period measured by an actual machine.
Figure 17:
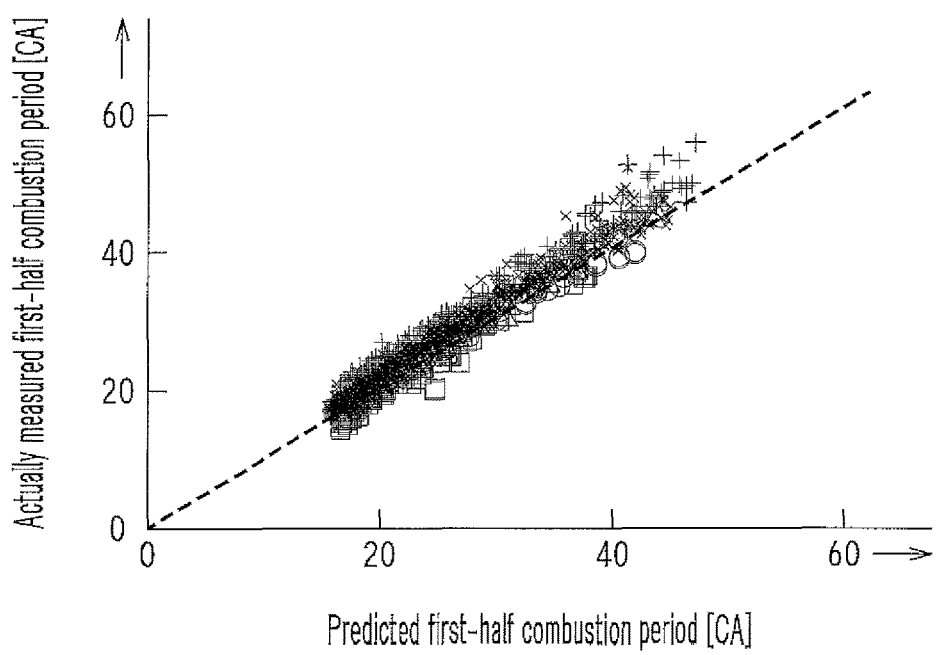
FIG. 17 is a graph indicating results obtained by verifying the relationship, in another engine, between the predicted first-half combustion period calculated by the expression (3) and the actually measured first-half combustion period measured by the actual machine.

FIGS. 16 and 17 are graphs indicating results obtained by verifying the relationship, in the respective engines that differ from each other, between the predicted first-half combustion period calculated by the expression (3) and the actually measured first-half combustion period measured by an actual machine. In order to obtain the predicted first-half combustion period, a prediction expression is used, which is obtained by identifying the coefficient C in the expression (3) according to the engine operation condition. In FIG. 16, the engine rotation speed Ne increases in the following order: "○"; "Δ"; "□"; "◇"; "×"; "+"; and "∇". For example, "○" represents 800 rpm, "Δ" represents 1000 rpm, "□" represents 1200 rpm, "◇" represents 1600 rpm, "×" represents 2400 rpm, "+" represents 3200 rpm and "∇" represents 3600 rpm. Also, in FIG. 17, the engine rotation speed Ne increases in the following order: "○"; "×"; "+"; "Δ"; and "□". For example, "○" represents 800 rpm, "×" represents 1200 rpm, "+" represents 2400 rpm, "Δ" represents 3600 rpm and "□" represents 4800 rpm.

As clearly shown in FIGS. 16 and 17, the predicted first-half combustion period substantially coincides with the actually measured first-half combustion period. Thus, it can be clearly seen that the first-half combustion period a is calculated with a high accuracy by the expression (3).

As described above, the first-half combustion period a can be estimated based on the in-cylinder volume $V_{@dQpeak}$ at heat generation rate maximum time and the engine rotation speed Ne, without being affected by the load rate, the air-fuel ratio, the EGR rate and the oil-water temperature. The in-cylinder volume $V_{@dQpeak}$ at heat generation rate maximum time and the engine rotation speed Ne are, as described above, the parameters correlated with the turbulence in the cylinder. In other words, it is considered that the load rate, the air-fuel ratio, the EGR rate and the oil-water temperature do not affect the first-half combustion period a because they have almost no correlation with the turbulence in the cylinder. The first-half combustion period a can be estimated based on the in-cylinder volume $V_{@dQpeak}$ at heat generation rate maximum time and the engine rotation speed Ne, which are the parameters correlated with the turbulence in the cylinder. There is no need to consider the load rate, the air-fuel ratio, the EGR rate and the oil-water temperature. Thus, it is possible to considerably reduce man-hours to determine the first-half combustion period a under various operation conditions of the engine.

As described above, the first-half combustion period is not affected by the load rate. The load rate is a parameter to control the fuel injection amount. The fuel injection amount is a control parameter that affects the in-cylinder fuel density. Thus, the first-half combustion period is estimated regardless of the in-cylinder fuel density. More specifically, as described above, the first-half combustion period is estimated based on the parameters affecting the turbulence in the cylinder such as the in-cylinder volume $V_{@dQpeak}$ at heat generation rate maximum time and the engine rotation speed Ne. On the other hand, the heat generation rate gradient is estimated based on the in-cylinder fuel density, as described later. Like this, the first-half combustion period and the heat generation rate gradient, which are to be estimated in this embodiment, are estimated respectively as the values independent from each other (i.e., values not depending from each other).

—Heat Generation Rate Gradient Estimation Part—

As described above, the heat generation rate gradient estimation part 4 estimates the gradient b/a of the heat generation rate (hereinafter referred to as "heat generation rate gradient") in the first-half combustion period.

The processing for estimating the heat generation rate gradient b/a is performed by the heat generation rate gradient estimation part 4 as described below.

The heat generation rate gradient b/a [J/CA$^2$] is principally estimated using the following expression (4) (i.e., the expression corresponds to the heat generation rate gradient estimation model).

[Expression 4]

$$\frac{b}{a} = C_3 \times \rho_{fuel@dQpeak} \quad (4)$$

In the above expression, $\rho_{fuel@dQpeak}$ represents the fuel density at the heat generation rate maximum time dQpeakA (i.e., in-cylinder fuel amount [mol]/in-cylinder volume [L] at the heat generation rate maximum time), which is also referred to as "fuel density at heat generation rate maximum time" hereinafter. $C_3$ represents the coefficient identified by experiments and the like.

The above expression (4) holds under the condition that the engine rotation speed is fixed, the air-fuel ratio is the theoretical air-fuel ratio, the EGR rate equals zero, the warming-up operation of the engine is finished (i.e., the oil-water temperature is the predetermined value or more), and the opening/closing timing of the intake valve is fixed. Affection due to the engine rotation speed, the air-fuel ratio, the EGR rate, the oil-water temperature of the engine, and the like will be described later.

The reason why the heat generation rate gradient b/a can be calculated by the above expression (4) will be described below.

FIGS. 18(a) to 18(d) are graphs indicating respectively heat generation rate waveforms obtained in respective engine operation states that differ from one another only in the load rate, by adjusting each spark time SA so that the respective heat generation rate maximum times dQpeakA match with one another, the heat generation rate waveforms being indicated in a manner overlapping with one another. The spark time gradually changes to the delay side in the order of FIG. 18(a) to FIG. 18(d). Also, the load rate in each Figure gradually increases in the order of KL1, KL2 and KL3. For example, in FIG. 18, KL1 represents 20% load rate, KL2 represents 30% load rate, and KL3 represents 40% load rate.

As shown in FIGS. 18(a) to 18(d), the heat generation rate gradient b/a is affected by the load rate and the spark time SA. In particular, in any of FIGS. 18(a) to 18(d) that differ from one another in the spark time SA, the heat generation rate gradient b/a increases as the load rate increases. The reason why the heat generation rate gradient b/a is affected by the load rate is considered to be the change in the in-cylinder fuel density according to the load rate. That is, the greater the load rate is, the greater the fuel amount in the cylinder is, which results in the in-cylinder fuel density being greater. Thus, the combustion speed of the air-fuel mixture also increases.

Figure 18:
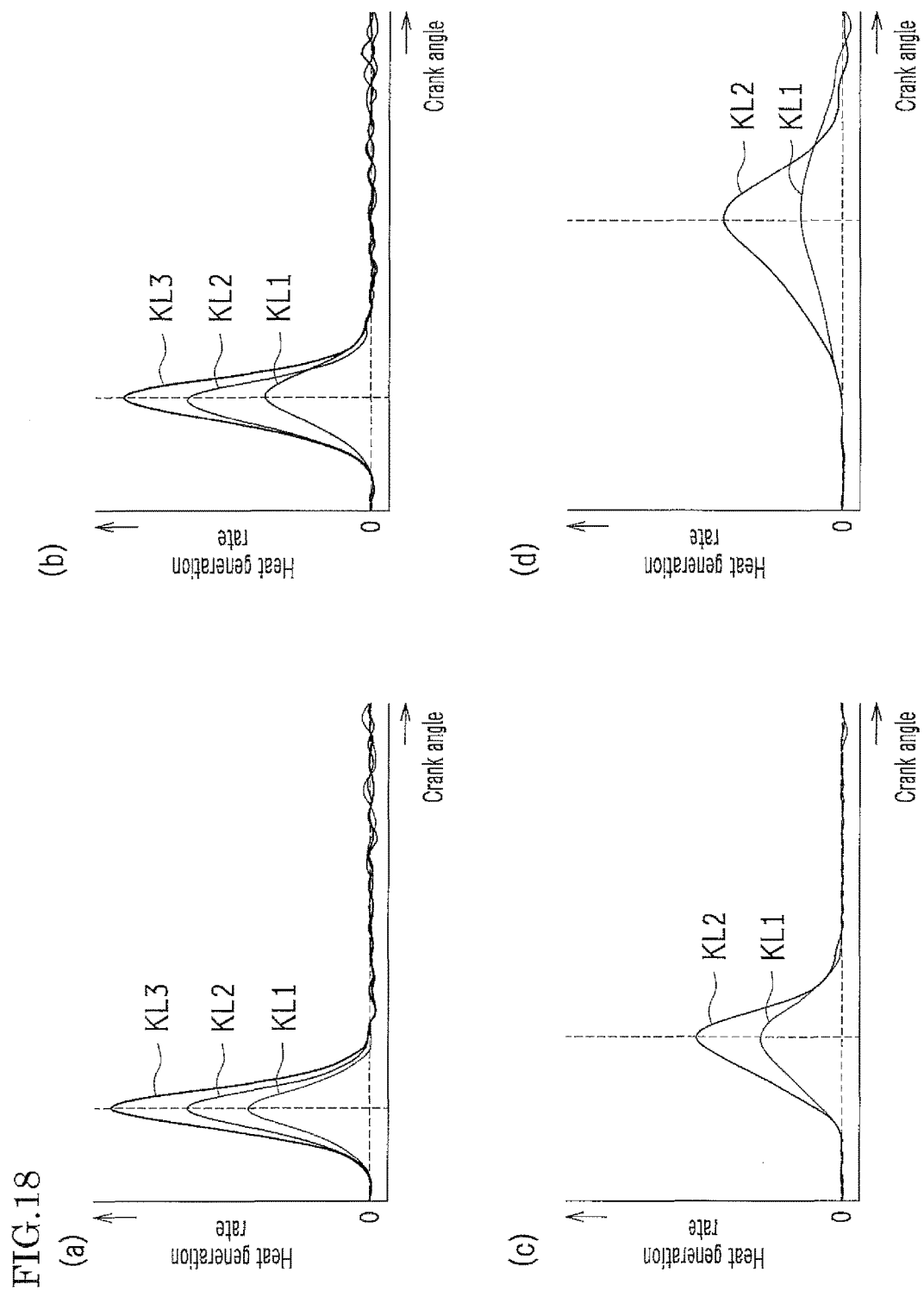
FIG. 18 are graphs indicating the heat generation rate waveforms obtained in the respective engine operation states that differ from one another only in the load rate, by adjusting each spark time SA so that the respective heat generation rate maximum times dQpeakA match with one another, the heat generation rate waveforms being indicated in a manner overlapping with one another.

As the spark time SA is shifted to the delay side in the order of FIG. 18(*a*) to FIG. 18(*d*), the heat generation rate gradient b/a decreases. FIGS. 19(*a*) and 19(*b*) are graphs indicating, in an overlapping manner, the heat generation rate waveforms obtained in the respective engine operation states that differ from one another only in the spark time SA, in order to study the influence due to the change in the spark time SA. The respective load rates in FIGS. 19(*a*) and 19(*b*) differ from each other, however, the heat generation rate gradients b/a in both Figures tend to decrease as the spark time SA is shifted to the delay side.

Thus, the reason why the heat generation rate gradient b/a is affected by the spark time SA is considered to be the in-cylinder fuel density, similarly to the above-described affection by the load rate. That is, when the piston is in the vicinity of the compression top dead center (TDC), the change in the in-cylinder volume according to the change in the crank angle is small. As the piston moves away from the TDC in the expansion stroke (for example, from the time of about ATDC 10° C.A), the in-cylinder volume increases, which results in gradual decrease in the in-cylinder fuel density.

Thus, as shown in FIGS. 19(*a*) and 19(*b*), according to the delay of the spark time SA, the heat generation rate waveform is shifted to the delay side as a whole. Furthermore, when the ignition time FA (i.e., starting point of the waveform) is after the TDC, the heat generation rate waveform gradient gradually decreases as the ignition time is delayed. As a result, the gradient of a straight line connecting the ignition time FA (starting point of the waveform) and the heat generation rate b (apex of the waveform) at the heat generation rate maximum time dQpeakA (i.e., the heat generation rate gradient b/a, which is indicated by the dashed-dotted line in the graph) also gradually decreases toward the delay side.

The influence of the delay of the spark time SA (i.e., delay of the ignition time FA) on the heat generation rate gradient b/a is clearly expressed by the relationship between the heat generation rate gradient b/a and the fuel density $\rho_{fuel@dQpeak}$ at heat generation rate maximum time. That is, as shown in FIGS. 19(*a*) and 19(*b*), the heat generation rate maximum time dQpeakA is shifted to the delay side according to the delay of the spark time SA. And as the in-cylinder volume at the heat generation rate maximum time dQpeakA (i.e., in-cylinder volume $V_{@dQpeak}$ at heat generation rate maximum time) increases, the fuel density $\rho_{fuel@dQpeak}$ at heat generation rate maximum time decreases, which leads to the decrease in the heat generation rate gradient b/a.

The inventor of the present invention studied the changes in the heat generation rate gradient b/a according to the changes in the fuel density ρfuel@dQpeak at heat generation rate maximum time. The experiment results are indicated in the graphs in FIGS. 20(*a*) to 20(*d*). In the respective graphs, the load rate increases in the following order: "○"; "×"; "+"; "Δ"; "□"; "◇"; "∇"; and "☆". For example, in FIG. 20, "○" represents 15% load rate, "×" represents 20% load rate, "+" represents 25% load rate, "Δ" represents 30% load rate, "□" represents 35% load rate, "◇" represents 40% load rate, "∇" represents 45% load rate and "☆" represents 50% load rate.

Figure 20:
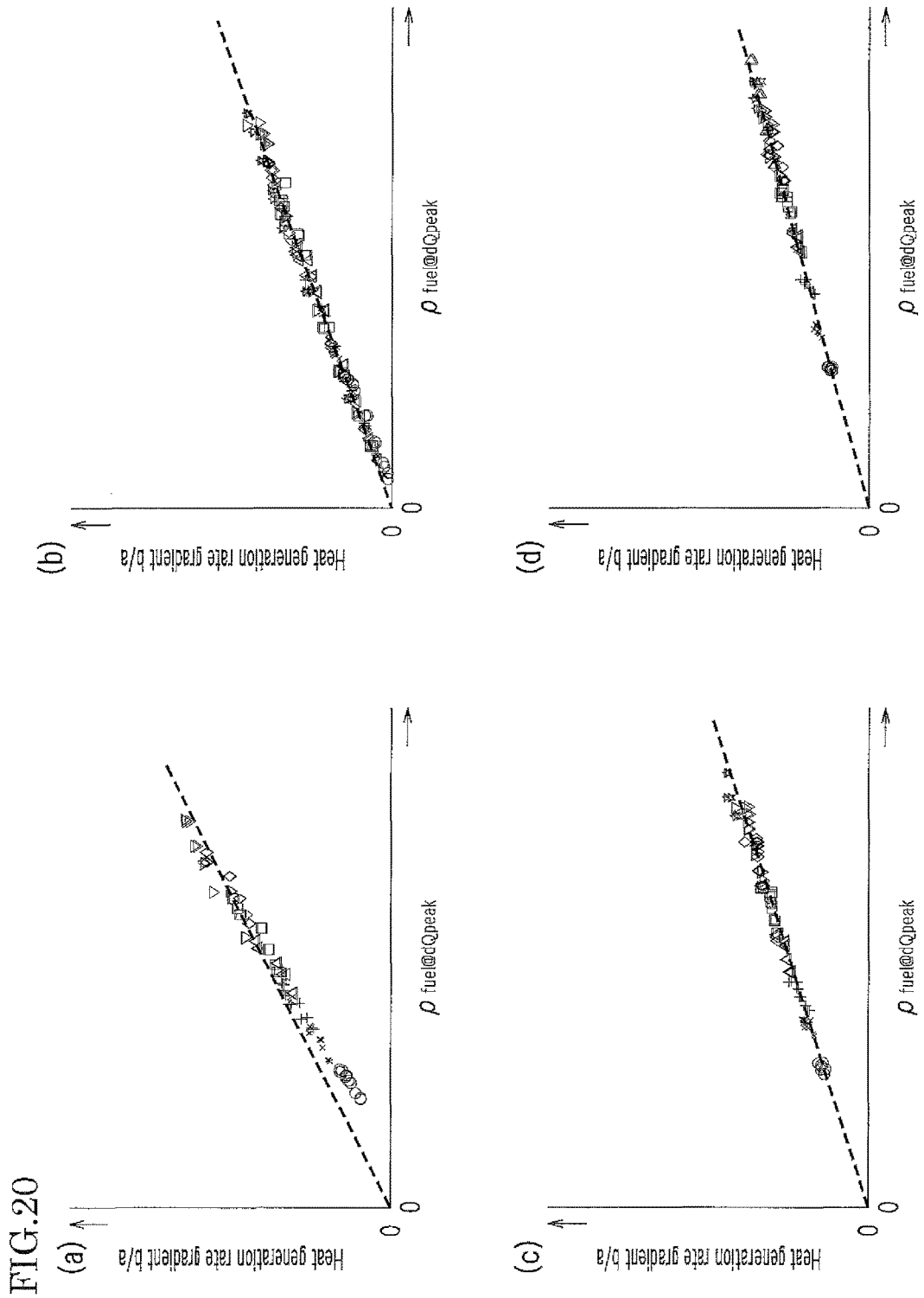
FIG. 20 are graphs indicating experimentally-obtained results of the relationship between a fuel density $\rho_{fuel@dQpeak}$ at heat generation rate maximum time and the heat generation rate gradient b/a in the respective engine rotation speeds Ne that differ from one another.

Also, the engine rotation speed Ne increases in the order of FIG. 20(*a*) to FIG. 20(*d*). For example, the engine rotation speed Ne is 800 rpm in FIG. 20(*a*), 1200 rpm in FIG. 20(*b*), 2000 rpm in FIG. 20(*c*) and 3200 rpm in FIG. 20(*d*).

As shown in FIGS. 20(*a*) to 20(*d*), when the engine rotation speed is fixed, the relationship between the fuel density $\rho_{fuel@dQpeak}$ at heat generation rate maximum time and the heat generation rate gradient b/a can substantially be expressed by one straight line even when the respective load rates and the spark times SA differ from one another. Thus, it can be seen that the fuel density $\rho_{fuel@dQpeak}$ at heat generation rate maximum time and the heat generation rate gradient b/a have a high correlation (specifically, a substantially proportional relation) with each other. That is, the influence of the engine load rate and the spark time SA on the heat generation rate gradient b/a can be collectively expressed by one parameter, i.e., the fuel density $\rho_{fuel@dQpeak}$ at heat generation rate maximum time.

From the above-described new knowledge, the inventor of the present invention derived the above expression (4).

As described above, the fuel density $\rho_{fuel@dQpeak}$ at heat generation rate maximum time, which is the variable in the expression (4), can be obtained by dividing the in-cylinder fuel amount by the in-cylinder volume $V_{@dQpeak}$ at heat generation rate maximum time. The steps of obtaining the in-cylinder volume $V_{@dQpeak}$ at heat generation rate maximum time are described above, in the description of the first-half combustion period estimation part 3. Also, the in-cylinder fuel amount is given as the input information from the heat generation rate waveform calculation device 1.

In this way, it is possible to calculate the heat generation rate gradient b/a, which is one of the characteristic values of the heat generation rate waveform, basically as a linear function (in this embodiment, exemplarily as a proportional function) of the fuel density $\rho_{fuel@dQpeak}$ at heat generation rate maximum time. In other words, the heat generation rate gradient b/a can be estimated mainly based on the fuel density $\rho_{fuel@dQpeak}$ at heat generation rate maximum time without considering the load rate and the spark time SA. Thus, it is possible to reduce man-hours to determine the heat generation rate gradient b/a under various operation conditions of the engine.

(Correction Based on Combustion Efficiency and Engine Rotation Speed)

In the above-described correlation between the heat generation rate gradient b/a and the fuel density $\rho_{fuel@dQpeak}$ at heat generation rate maximum time, it is preferable to use, as the in-cylinder fuel amount for calculating the fuel density $\rho_{fuel@dQpeak}$ at heat generation rate maximum time, the fuel amount that actually burns in the cylinder except the unburned amount. That is, when the oil-water temperature is lower, for example, during the warming-up operation of the engine, the combustion efficiency is reduced. Apart from the above, the combustion efficiency may change when the load rate or the heat generation rate maximum time dQpeakA changes. Thus, an expression (5) stated below can be obtained by multiplying the right side of the expression (4) by a correction coefficient k based on the combustion efficiency.

[Expression 5]

$$\frac{b}{a} = C_3 \times \rho_{fuel@dQpeak} \times k \tag{5}$$

As described above, the fuel density $\rho_{fuel@dQpeak}$ at heat generation rate maximum time can be obtained by dividing the in-cylinder fuel amount by the in-cylinder volume $V_{@dQpeak}$ at heat generation rate maximum time. Thus, the expression (5) may be expressed as an expression (6) below.

[Expression 6]

$$\frac{b}{a} = C_3 \times \frac{\text{In-cylinder Fuel Amount} \times k}{V_{@dQpeak}} \quad (6)$$

Also, the "in-cylinder fuel amount×k" in the expression 6 may be substituted by the heat generation amount (total heat generation amount $Q_{all}$) generated throughout the entire combustion period. Thus, the expression (6) may be expressed as an expression (7) below.

[Expression 7]

$$\frac{b}{a} = C_3 \times \frac{Q_{all}}{V_{@dQpeak}} \quad (7)$$

Figure 13:
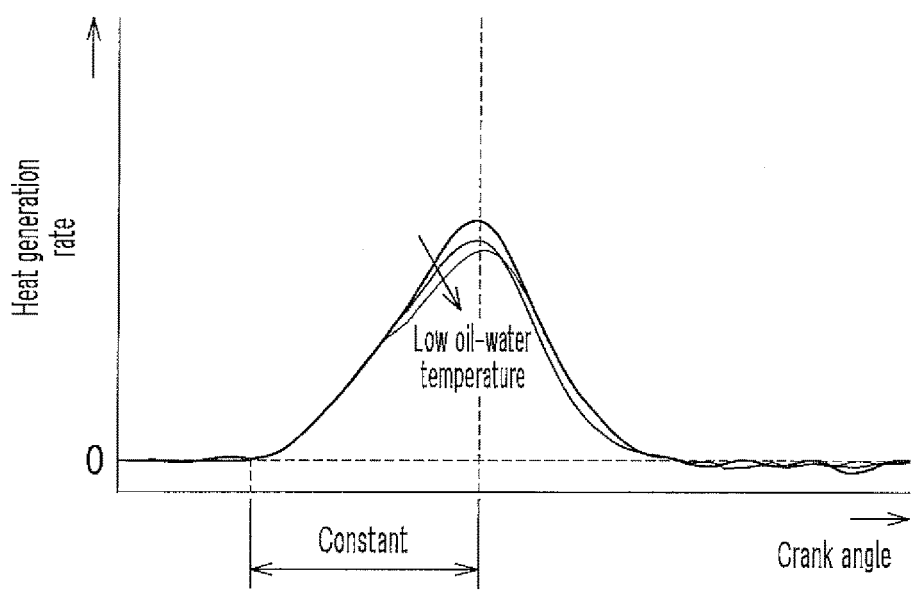
FIG. 13 is a graph indicating the heat generation rate waveforms obtained in respective engine operation states that differ from one another only in the oil-water temperature, by adjusting each spark time SA so that the respective heat generation rate maximum times dQpeakA match with one another, the heat generation rate waveforms being indicated in a manner overlapping with one another.
Figure 26:
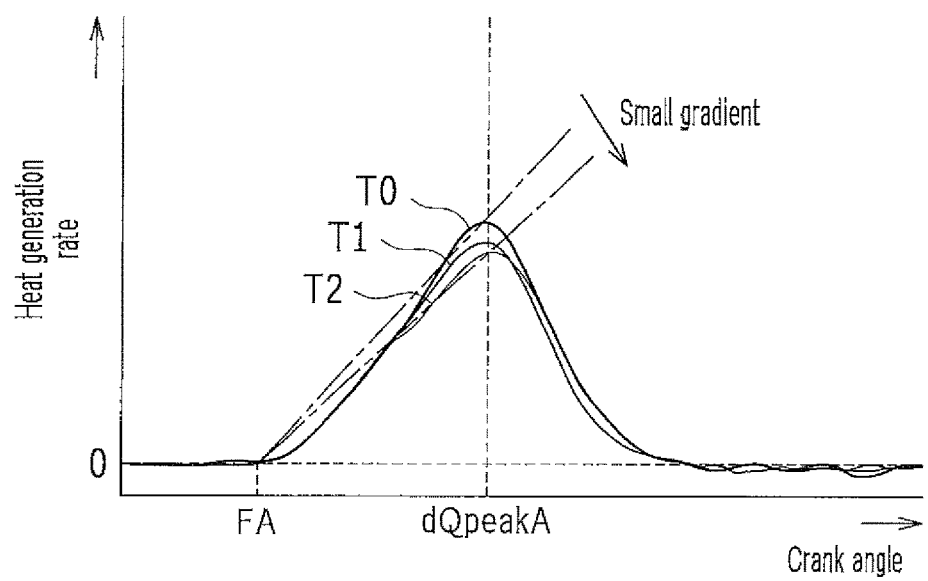
FIG. 26 is a graph indicating influence on the heat generation rate gradient due to changes in the oil-water temperature.

As one example showing the influence of the combustion efficiency, when viewing the heat generation rate waveforms in the case that the respective oil-water temperatures of the engine differ from one another as shown in FIG. 13, it can be seen that the heat generation rate gradient b/a is affected by the oil-water temperature as shown in FIG. 26. That is, the oil-water temperature in FIG. 26 decreases in the order of T0, T1 and T2. For example, T0 represents 88° C. that corresponds to the temperature upon completion of the warming-up operation of the engine. Also, T1 represents 40° C., and T2 represents 20° C.

As shown in FIG. 26, as the oil-water temperature decreases, the heat generation rate gradient b/a decreases. The reason for the above is considered to be the fact that as the oil-water temperature decreases, the unburned amount the fuel or cooling loss increases, which results in degradation of the combustion efficiency. Taking into account the fact that the influence of the combustion efficiency is included in the total heat generation amount $Q_{all}$, the following relationship was studied: the relationship between the value obtained by dividing the total heat generation amount $Q_{all}$ by the in-cylinder volume $V_{@dQpeak}$ at heat generation rate maximum time (as shown in the expression (7)) and the heat generation rate gradient b/a. The results are indicated in FIG. 27.

Figure 27:
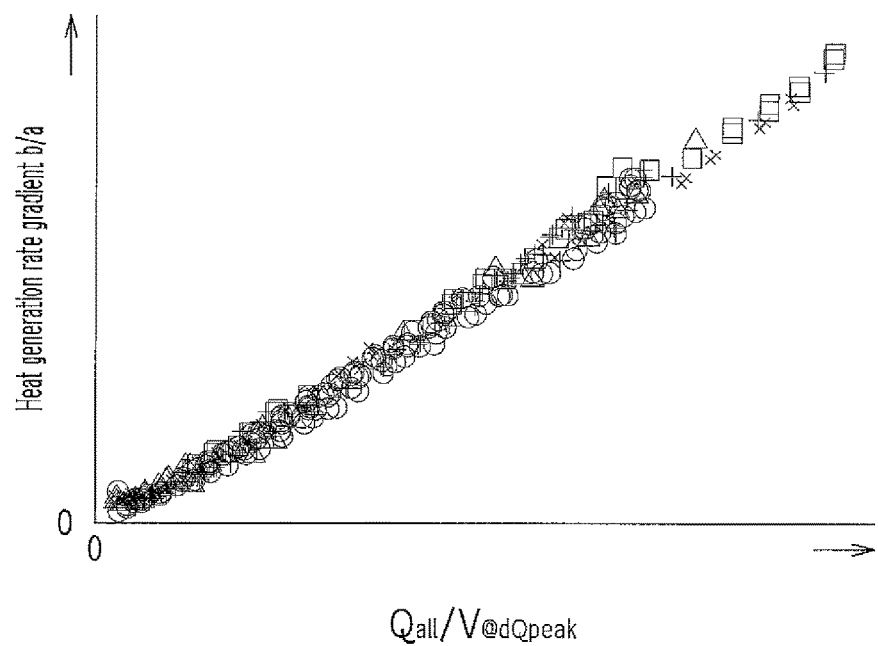
FIG. 27 is a graph indicating experimentally-obtained results of the relationship between the heat generation rate gradient b/a and the value obtained by dividing a total heat generation amount $Q_{all}$ including the influence of the oil-water temperature by an in-cylinder volume $V_{@dQpeak}$ at heat generation rate maximum time.

In FIG. 27, the oil-water temperature increases in the following order: "○"; "×"; "+"; "Δ"; and "□". For example, "○" represents 20° C., "×" represents 40° C., "+" represents 60° C., "Δ" represents 80° C. and "□" represents 88° C. As shown in FIG. 27, the relationship between the $Q_{all}/V_{@dQpeak}$ and the heat generation rate gradient b/a can substantially be expressed by one straight line even when the respective oil-water temperatures considerably differ from one another. Thus, it can be seen that the $Q_{all}/V_{@dQpeak}$ and the heat generation rate gradient b/a have a high correlation (in this embodiment, a substantially proportional relation) with each other. That is, using the correction coefficient k based on the combustion efficiency, it is possible to calculate the heat generation rate waveform b/a that appropriately reflects the influence of the changes in the oil-water temperature.

Meanwhile, regarding the influence of the engine rotation speed Ne, as shown in FIGS. 20(a) to 20(d), the correlation between the fuel density $\rho_{fuel@dQpeak}$ at heat generation rate maximum time and the heat generation rate gradient b/a changes according to the engine rotation speed Ne. Specifically, the heat generation rate gradient b/a tends to decrease in the order of FIG. 20(a) to FIG. 20(d) as the engine rotation speed Ne increases. Thus, it is possible to use the following expression (8) by multiplying the right side of the expression (4) by a correction coefficient $Ne^\varepsilon$ based on the engine rotation speed Ne.

[Expression 8]

$$\frac{b}{a} = C_3 \times \rho_{fuel@dQpeak} \times Ne^\varepsilon \quad (8)$$

Here, $\varepsilon$ is identified by experiments and the like. As described above, the heat generation rate gradient b/a tends to decrease as the engine rotation speed Ne increases. Thus, $\varepsilon$ is a negative value in general.

Regarding the influence of the engine rotation speed Ne, as described in the description of the first-half combustion period estimation part 3, as the engine rotation speed Ne increases, the change in the crank angle per time increases, which would lead to decrease in the heat generation rate gradient b/a. However, it can be seen, from the comparison of FIG. 20(a) with FIG. 20(d), that even when the engine rotation speed Ne is quadrupled, the heat generation rate gradient b/a is not quartered.

As described above in the description of the first-half combustion period estimation part 3, this is probably because the combustion speed increases due to the fact that the turbulence in the cylinder increases as the engine rotation speed Ne increases. As the engine rotation speed Ne increases, the combustion speed increases, which results in the heat generation rate gradient b/a not decreasing to the extent that the crank angle per time changes.

(Correction Based on in-Cylinder Volume at Heat Generation Rate Maximum Time)

Figure 21:
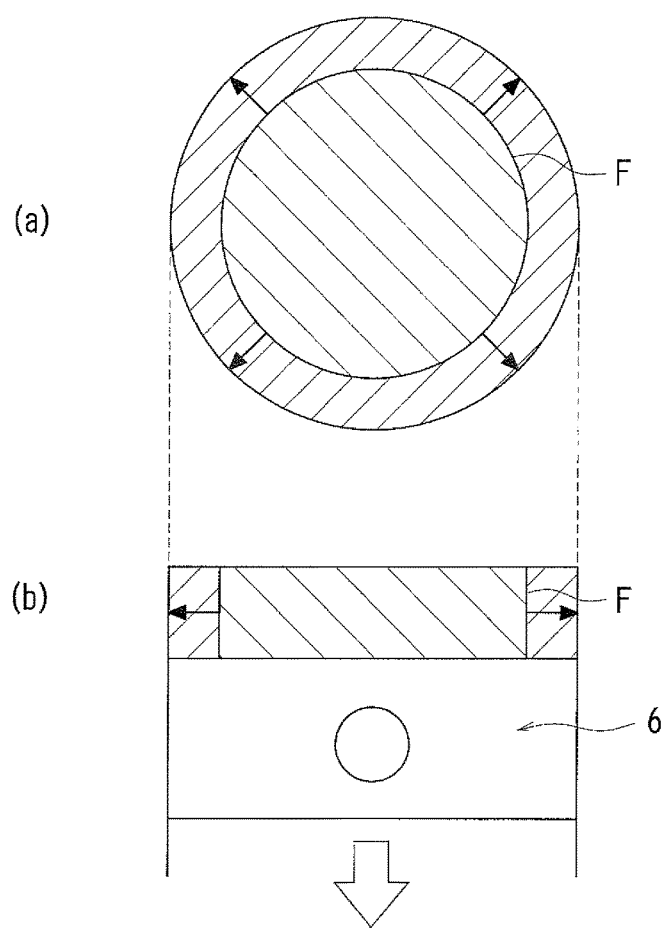
FIG. 21 are diagrams schematically illustrating a state of a combustion field in a cylinder.

The reason why the heat generation rate gradient b/a can be calculated based on the fuel density $\rho_{fuel@dQpeak}$ at heat generation rate maximum time as described above is considered as follows. In view of the state of the combustion field in the cylinder, the heat generation rate gradient b/a is affected by the turbulent combustion speed and the turbulent flame surface area. FIG. 21 are diagrams schematically illustrating the state of the combustion field in the cylinder. FIG. 21(a) is a plan view viewed in the axial direction of the cylinder, while FIG. 21(b) is a side view (the reference numeral 6 indicates a piston). Also, in FIG. 21, the region indicated by the solid diagonal line represents a burned portion, while the region indicated by the dashed diagonal line represents an unburned portion.

As schematically indicated by the arrows in FIG. 21, the area of the flame surface F that propagates toward the unburned portion from the outer edge of the burned portion is the turbulent flame surface area, and the propagation speed (i.e., the speed of the flame surface F propagating toward the outer periphery in the cylinder) is the turbulent combustion speed. The volume of the combustion field per unit time is obtained by multiplying the turbulent flame surface area by the turbulent combustion speed, thus, the heat generation rate is obtained by multiplying the volume of the combustion field per unit time by the fuel density. Therefore, the heat generation rate (maximum heat generation rate b) at the heat generation rate maximum time dQpeakA is obtained by the following expression (9).

[Expression 9]

$$b = C_3 \times \rho_{fuel@dQpeak} \times At_{@dQpeak} \times St_{@dQpeak} \quad (9)$$

Here, $At_{@dQpeak}$ represents the turbulent flame surface area at the heat generation rate maximum time dQpeakA, while $St_{@dQpeak}$ represents the turbulent combustion speed at the heat generation rate maximum time dQpeakA. From the above expression (9), the heat generation rate gradient b/a is expressed by the following expression (10).

[Expression 10]

$$\frac{b}{a} = \frac{C_3 \times \rho_{fuel@dQpeak} \times At_{@dQpeak} \times St_{@dQpeak}}{a} \quad (10)$$

Here, generally, it can be considered that the turbulent combustion speed St is approximately proportional to the turbulence intensity u' in the cylinder. As described above, when the turbulence increases, the first-half combustion period a decreases. Thus, it can be considered, in general, that the turbulent combustion speed St is inversely proportional to the first-half combustion period a. Meanwhile, the turbulent flame surface area At at the time of ATDC, i.e., in the expansion stroke of the cylinder, is correlated with the in-cylinder volume V. As the ignition time is delayed, the flame area that propagates toward the outer periphery in the cylinder increases. Thus, it can be considered, in general, that the turbulent flame surface area At is proportional to the exponential function of the in-cylinder volume V. Therefore, from the above expression (10), the following expression (11) can be obtained. Note that η and $C_4$ are identified by experiments and the like.

[Expression 11]

$$\frac{b}{a} = \frac{C_4 \times \rho_{fuel@dQpeak} \times V_{@dQpeak}^{\eta}}{a^2} \quad (11)$$

Regarding the first-half combustion period a, when the engine rotation speed Ne is fixed in the above expression (3), the following equation holds: $a = C \times V_{@dQpeak}^{\alpha}$. Then, the above "a" is substituted into the above expression (11) so as to obtain the following expression (12).

[Expression 12]

$$\frac{b}{a} = C_4 \times \rho_{fuel@dQpeak} \times V_{@dQpeak}^{\eta-2\alpha} \quad (12)$$

In the above expression (12), the value η can substantially be considered to be "1" and the value α can substantially be considered to be "½". Therefore, the value $V_{@dQpeak}^{\eta-2\alpha}$ can substantially be considered to be "1". Thus, from the expression (12), the above expression (4) can be obtained.

However, the above $V_{@dQpeak}^{\eta-2\alpha}$, i.e., the exponential function of the in-cylinder volume at heat generation rate maximum time, is considered to be the value that indicates the influence of the turbulence in the cylinder similarly to the above-described engine rotation speed Ne. Therefore, if the heat generation rate gradient b/a should be obtained with a higher accuracy, it is preferable to maintain $V_{@dQpeak}^{\eta-2\alpha}$. Then, the following expression (13) to calculate the heat generation rate gradient b/a is obtained by multiplying the right side of the expression (8) by the value obtained by replacing the exponent "η−2α" of $V_{@dQpeak}^{\eta-2\alpha}$ with "κ", as the correction coefficient based on the in-cylinder volume $V_{@dQpeak}$ at heat generation rate maximum time. Note that κ is identified by experiments and the like.

[Expression 13]

$$\frac{b}{a} = C_4 \times \rho_{fuel@dQpeak} \times V_{@dQpeak}^{\kappa} \times Ne^{\varepsilon} \quad (13)$$

The above expression (13) can be considered to be obtained by integrally expressing "$At_{@dQpeak} \times St_{@dQpeak}/a$" in the expression (10) as "$V_{@dQpeak}^{\kappa}$". Also, the right side of the expression (13) may be multiplied by the correction coefficient k so that it reflects the influence of the above-described combustion efficiency, thus, the heat generation rate gradient b/a may be calculated by the following expression (14).

[Expression 14]

$$\frac{b}{a} = C_4 \times \rho_{fuel@dQpeak} \times k \times V_{@dQpeak}^{\kappa} \times Ne^{\varepsilon} \quad (14)$$

The fuel density $\rho_{fuel@dQpeak}$ at heat generation rate maximum time can be expressed by the in-cylinder fuel amount and the in-cylinder volume $V_{@dQpeak}$ at heat generation rate maximum time, thus, it is possible to obtain the following expression (15). Also, it is possible to obtain the following expression (16) by replacing the "in-cylinder fuel amount×k" in the expression (15) with the total heat generation amount $Q_{all}$.

[Expression 15]

$$\frac{b}{a} = C_4 \times \frac{\text{In-cylinder Fuel Amount} \times k}{V_{@dQpeak}} \times V_{@dQpeak}^{\kappa} \times Ne^{\varepsilon} \quad (15)$$

[Expression 16]

$$\frac{b}{a} = C_4 \times \frac{Q_{all}}{V_{@dQpeak}} \times V_{@dQpeak}^{\kappa} \times Ne^{\varepsilon} \quad (16)$$

(Correction Based on Air-Fuel Ratio and EGR Rate)

Next, the influence of the air-fuel ratio and the EGR rate on the heat generation rate gradient b/a will be described. FIG. 22 are graphs of experiment results that indicate changes in the heat generation rate waveform due to changes in the air-fuel ratio. FIGS. 22(a) and 22(b) indicate, in an overlapping manner, the heat generation rate waveforms obtained by the changes in the air-fuel ratio, by adjusting each spark time SA so that the respective heat generation rate maximum times dQpeakA match with one another, similarly to FIG. 12.

More specifically, FIG. 22(a) indicates the case in which the air-fuel ratio is changed so that it exceeds the theoretical air-fuel ratio (i.e., shifted to the lean side). On the other hand, FIG. 22(b) indicates the case in which the air-fuel ratio is changed so that it is less than the theoretical air-fuel ratio (shifted to the rich side). For example, in FIGS. 22(a) and 22(b), AF0 represents the theoretical air-fuel ratio (A/F=14.6). In FIG. 22(a), AF1 represents A/F=19.5. In contrast, in FIG. 22(b), AF2 represents A/F=12.0.

As can be seen from FIGS. 22(a) and 22(b), the heat generation rate gradient b/a is affected by the air-fuel ratio, and it decreases as the air-fuel ratio increases (i.e., is leaner).

The reason why the heat generation rate gradient b/a is affected by the air-fuel ratio is that when the air-fuel ratio exceeds (i.e., is leaner than) the theoretical air-fuel ratio, molecules in the air such as nitrogen and oxygen that do not contribute to the reaction (combustion) of the fuel and oxygen prevent the flame surface from propagating. In this case, as the air-fuel ratio increases, the amount of the surplus air increases, which results in reduction in the combustion speed.

On the other hand, when the air-fuel ratio is slightly smaller (i.e., richer) than the theoretical air-fuel ratio, the encounter rate of the molecules of the fuel and oxygen increases, which increases the combustion speed of the air-fuel mixture. However, when the air-fuel ratio further decreases (i.e., becomes richer), the combustion state is precipitously degraded, which finally leads to flame-out. In FIG. 22(b), when the air-fuel ratio is smaller (richer) than the case of A/F=12.0, it is considered that the combustion state is degraded.

Figure 23:
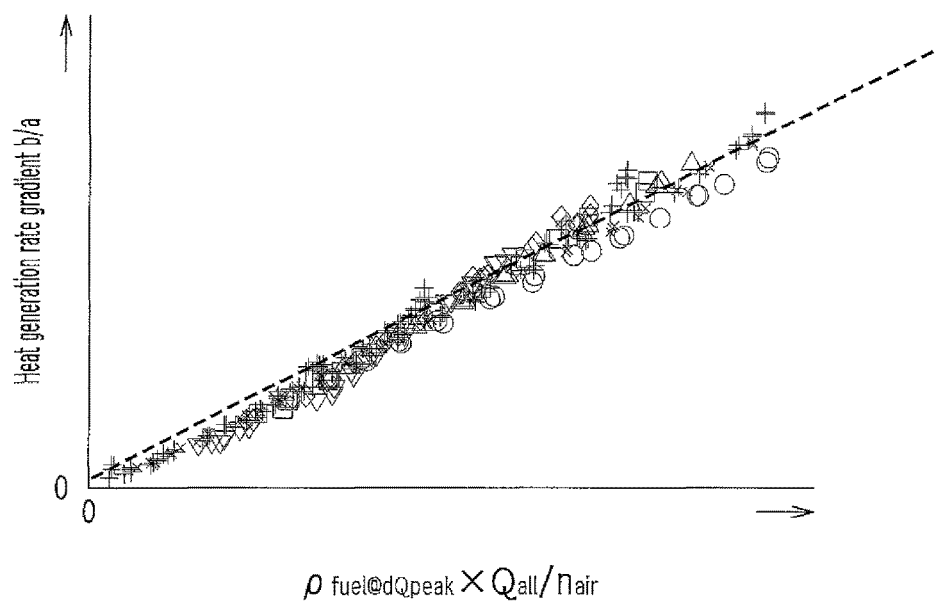
FIG. 23 is a graph indicating results obtained by verifying the relationship between the heat generation rate gradient b/a and the fuel density $\rho_{fuel@dQpeak}$ at heat generation rate maximum time multiplied by a correction coefficient based on the air-fuel ratio.

Thus, the inventor of the present invention studied the changes in the heat generation rate gradient b/a according to the changes in the air-fuel ratio. The experiments results are indicated as a graph in FIG. 23. In FIG. 23, the air-fuel ratio increases in the following order: "○"; "x"; "+"; "Δ"; and "□". For example, "○" represents A/F=12.5, "x" represents A/F=13.5, "+" represents A/F=14.6, "Δ" represents A/F=15.5 and "□" represents A/F=16.5.

As shown in FIG. 23, when the fuel density $\rho_{fuel@dQpeak}$ at heat generation rate maximum time is multiplied by a correction coefficient $Q_{all}/n_{air}$ based on the air-fuel ratio, the relationship between the corrected fuel density ($\rho_{fuel@dQpeak} \times Q_{all}/n_{air}$) and the heat generation rate gradient b/a can substantially be expressed by one straight line even when the respective air-fuel ratios differ from one another. Thus, the influence of the air-fuel ratio on the heat generation rate gradient b/a can be suitably reflected by multiplication by the correction coefficient $Q_{all}/n_{air}$ as described above.

Here, the correction coefficient $Q_{all}/n_{air}$ is a value obtained by dividing the total heat generation amount $Q_{all}$ by the in-cylinder air amount $n_{air}$ [mol], and the total heat generation amount $Q_{all}$ is expressed as in-cylinder fuel amount $n_{fuel}$ [mol]×combustion efficiency k, thus the following equation holds: $Q_{all}/n_{air}$=in-cylinder fuel amount $n_{fuel}$×combustion efficiency k/in-cylinder air amount $n_{air}$=k/AF. Thus, $Q_{all}/n_{air}$ is based on the air-fuel ratio.

The right side of the above-described expression (13) is multiplied by the correction coefficient $Q_{all}/n_{air}$ based on the air-fuel ratio so as to obtain the following expression (17) that reflects the influence of the air-fuel ratio. Regarding the variables $Q_{all}$ and $n_{air}$, they may be used as the exponential functions $Q_{all}^{\zeta}$ and $n_{air}^{\zeta}$ so as to match with the experiments results. Alternatively, in lieu of multiplication by the correction coefficient based on the air-fuel ratio, the influence of the air-fuel ratio may be reflected using a correction map created by experiments.

[Expression 17]

$$\frac{b}{a} = C_4 \times \rho_{fuel@dQpeak} \times \frac{Q_{all}}{n_{air}} \times V_{@dQpeak}^{\kappa} \times Ne^{\varepsilon} \quad (17)$$

In the above-described expression (17), when the value $\rho_{fuel@dQpeak}$ is expressed in accordance with the equation $\rho_{fuel@dQpeak}$=in-cylinder fuel amount $n_{fuel}/V_{@dQpeak}$, the following expression (18) is obtained. In this expression (18), when the value $n_{fuel}/n_{air}$ is expressed in accordance with the equation $n_{fuel}/n_{air}$=1/AF, the following expression (19) is obtained.

[Expression 18]

$$\frac{b}{a} = C_4 \times \frac{n_{fuel}}{V_{@dQpeak}} \times \frac{Q_{all}}{n_{air}} \times V_{@dQpeak}^{\kappa} \times Ne^{\varepsilon} \quad (18)$$

[Expression 19]

$$\frac{b}{a} = C_4 \times \frac{Q_{all}}{V_{@dQpeak}} \times \frac{1}{AF} \times V_{@dQpeak}^{\kappa} \times Ne^{\varepsilon} \quad (19)$$

Figure 24:
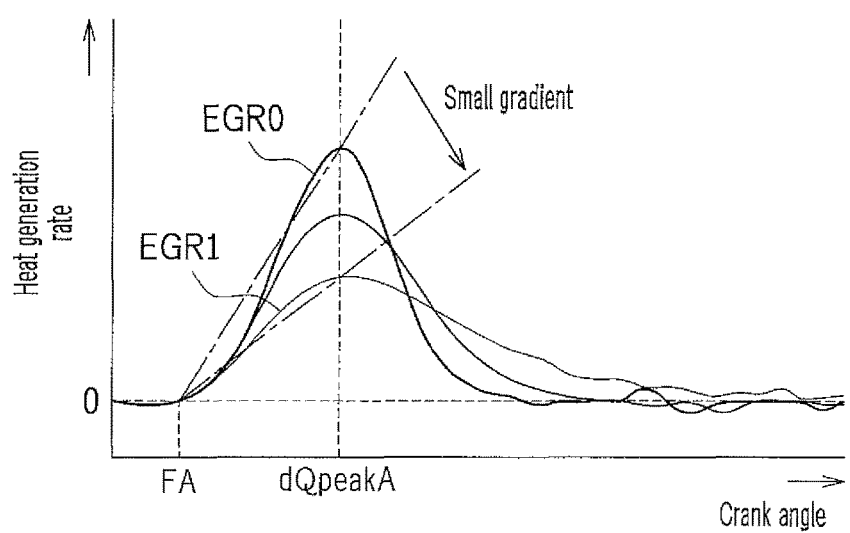
FIG. 24 is a graph indicating influence on the heat generation rate gradient due to changes in the EGR rate.

Next, FIG. 24 indicates the influence on the heat generation rate waveform due to changes in the EGR rate. FIG. 24 indicates, in an overlapping manner, the heat generation rate waveforms obtained by the changes in the EGR rate, by adjusting each spark time SA so that the respective heat generation rate maximum times dQpeakA match with one another, similarly to FIG. 11. For example, EGR0 in the graph represents 0%, while EGR1 represents 20%.

As can be seen from FIG. 24, the heat generation rate gradient b/a is affected by the EGR rate. The heat generation rate gradient b/a decreases as the EGR rate increases. That is, the greater the EGR rate is, the smaller the combustion speed is. The reason why the heat generation rate gradient b/a is affected by the EGR rate is considered to be the fact that molecules of the EGR gas that do not contribute to the reaction (combustion) of the fuel and oxygen prevent the flame surface from propagating.

Figure 25:
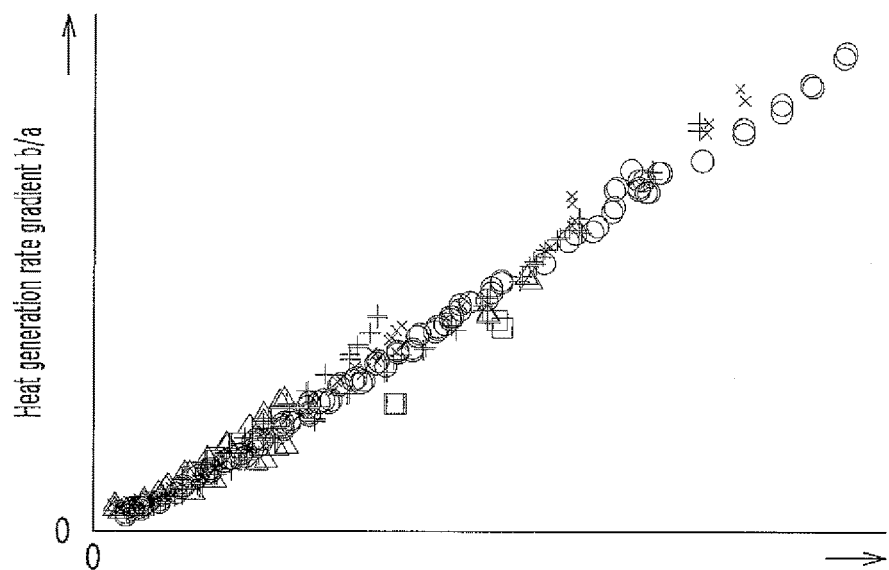
FIG. 25 is a graph indicating results obtained by verifying the relationship between the heat generation rate gradient b/a and the fuel density $\rho_{fuel@dQpeak}$ at heat generation rate maximum time multiplied by a correction coefficient based on the EGR rate.

The experiment was performed to study the changes in the heat generation rate gradient b/a according to the changes in the EGR rate. The experiment results are indicated as a graph in FIG. 25. In FIG. 25, the EGR rate increases in the following order: "○"; "x"; "+"; "Δ"; and "□". For example, "○" represents the EGR rate $ek_{egr}$=0%, "x" represents $ek_{egr}$=10%, "+" represents $ek_{egr}$=15%, "Δ" represents $ek_{egr}$=20% and "□" represents $ek_{egr}$=25%.

In FIG. 25, a correction is performed by multiplying the fuel density $\rho_{fuel@dQpeak}$ at heat generation rate maximum time by a correction coefficient $(100-ek_{egr})/100$ based on the EGR rate. The relationship between the corrected fuel density ($\rho_{fuel@dQpeak} \times (100-ek_{egr})/100$) and the heat generation rate gradient b/a can substantially be expressed by one straight line even when the EGR rates differ from one another. Thus, the influence of the EGR rate on the heat generation rate gradient b/a can be suitably reflected by multiplication by the correction coefficient $(100-ek_{egr})/100$ as described above.

Thus, the right side of the above-described expression (13) is multiplied by the correction coefficient $(100-ek_{egr})/100$ based on the EGR rate so as to obtain the following expression (20) that reflects the influence of the EGR rate. Regarding the value $ek_{egr}$ in the expression (20), it may also be used as the exponential functions $ek_{egr}$ so as to match with the experiments results. Alternatively, in lieu of multiplication by the correction coefficient $(100-ek_{egr})/100$ based on the EGR rate, the influence of the EGR rate may be reflected using a correction map created by experiments.

[Expression 20]

$$\frac{b}{a} = C_4 \times \rho_{fuel@dQpeak} \times \frac{100 - ek_{egr}}{100} \times V_{@dQpeak}^{\kappa} \times Ne^{\varepsilon} \qquad (20)$$

By integrating the corrections to the heat generation rate gradient b/a based on the above-described air-fuel ratio and the EGR rate, the following expression (21) can be obtained from the above-described expressions (19) and (20).

[Expression 21]

$$\frac{b}{a} = C_4 \times \frac{Q_{all}}{V_{@dQpeak}} \times \frac{1}{AF} \times \frac{100 - ek_{egr}}{100} \times V_{@dQpeak}^{\kappa} \times Ne^{\varepsilon} \qquad (21)$$

By integrally expressing the correction coefficient $Q_{all}/n_{air}$ based on the air-fuel ratio and the correction coefficient $(100-ek_{egr})/100$ based on the EGR rate, the expression (21) may also be expressed as the following expression (22).

[Expression 22]

$$\frac{b}{a} = C_5 \times \frac{Q_{all}}{V_{@dQpeak}} \times \frac{1}{G/F} \times V_{@dQpeak}^{\kappa} \times Ne^{\varepsilon} \qquad (22)$$

In the above expression, G is obtained by adding the EGR gas amount $n_{EGR}$ [mol] to the in-cylinder air amount $n_{air}$ [mol], while F represents the in-cylinder fuel amount $n_{fuel}$ [mol]. Thus, $G/F=(n_{air}+n_{EGR})/n_{fuel}$ holds. The correction coefficient G/F represents the influence caused by the fact that nitrogen and oxygen in the surplus air and the EGR gas prevent the flame surface from propagating.

As described above, basically the heat generation rate gradient b/a is calculated based on the fuel density $\rho_{fuel@dQpeak}$ at heat generation rate maximum time. And if necessary, the correction based on the combustion efficiency, the engine rotation speed, the in-cylinder volume at heat generation rate maximum time, the air-fuel ratio, the EGR rate and the like is performed so that their influence can be suitably reflected and that the heat generation rate gradient b/a can be estimated with a higher accuracy.

—Heat Generation Amount Estimation Part—

As described above, the heat generation amount estimation part 5 estimates the heat generation amount (total heat generation amount $Q_{all}$) generated throughout the entire combustion period.

Hereinafter, the estimation operation performed by the heat generation amount estimation part will be described, which is to obtain the total heat generation amount $Q_{all}$.

First, the heat generation amount Q1 in the first-half combustion period a is calculated by the following expression (23).

[Expression 23]

$$Q_1 = \frac{1}{2} \times \frac{b}{a} \times a^2 \qquad (23)$$

Meanwhile, as described above, the total heat generation amount $Q_{all}$ is expressed as the following expression: in-cylinder fuel amount×k (combustion efficiency) (i.e., the expression corresponds to the heat generation amount estimation model). When the oil-water temperature is lower, for example, during the warming-up operation, the combustion efficiency k reduces. Also, the combustion efficiency k changes due to the changes in the load rate or the engine rotation speed. Thus, in this embodiment, a map is previously set, using experimental database of the various engines, in order to determine the value of the combustion efficiency k by associating the combustion efficiency k with the oil-water temperature, the load rate and the engine rotation speed. Then, the total heat generation amount $Q_{all}$ is calculated based on the in-cylinder fuel amount, by using the combustion efficiency k.

As described above with reference to FIG. 2, in order to produce the heat generation rate waveform, it is necessary to obtain the heat generation rate b at the heat generation rate maximum time dQpeakA and the second-half combustion period c. The heat generation amount Q2 in the second-half combustion period c is obtained by the following expression (24).

[Expression 24]

$$Q_2 = Q_{all} - Q_1 \qquad (24)$$

Also, the heat generation rate b at the heat generation rate maximum time dQpeakA is obtained by the following expression (25), and the second-half combustion period c is obtained by the following expression (26).

[Expression 25]

$$b = \frac{b}{a} \times a \qquad (25)$$

[Expression 26]

$$c = 2 \times \frac{Q_2}{b} \qquad (26)$$

In view of the foregoing, the following are performed in the heat generation rate waveform calculation device 1: estimation of the ignition delay period τ using the ignition delay estimation model by the ignition delay estimation part 2; estimation of the first-half combustion period a using the first-half combustion period estimation model by the first-half combustion period estimation part 3; estimation of the heat generation rate gradient b/a using the heat generation rate gradient estimation model by the heat generation rate gradient estimation part 4; estimation of the heat generation amount $Q_{all}$ using the heat generation amount estimation model by the heat generation amount estimation part 5; and calculation of the maximum heat generation rate b and the second-half combustion period c. Also, in the heat generation rate waveform calculation device 1, the triangular waveform that is approximated to the heat generation rate waveform is produced using the above calculated values, as shown in FIG. 2, thus the triangular waveform is output as the heat generation rate waveform. Using the output heat generation rate waveform, the system, control and adaptive values are reviewed when designing an engine.

As described above, in this embodiment, when the triangular waveform, which is approximated to the heat generation rate waveform of the engine, is produced, the first-half combustion period a is used as one of the characteristic values. Thus, the first-half combustion period a is considered to be a value not affected by any of the engine load rate, the EGR rate, the air-fuel ratio and the oil-water temperature, and it is calculated based on the in-cylinder volume $V_{@dQpeak}$ at heat generation rate maximum time and the engine rotation speed Ne. Thus, it is possible to considerably reduce man-hours to determine the first-half combustion period a.

Also, in this embodiment, the heat generation rate gradient b/a from the ignition time to the heat generation rate maximum time dQpeakA is used as one of the characteristic values of the heat generation rate waveform (triangular waveform). Thus, the heat generation rate gradient b/a is calculated based on the fuel density $\rho_{fuel@dQpeak}$ at heat generation rate maximum time. For this reason, it is possible to reduce man-hours to determine the heat generation rate gradient b/a, compared with the case in which it is calculated based on both the engine load rate and the spark time.

Thus, since the heat generation rate waveform (triangular waveform) is produced using the above calculated values of the first-half combustion period a and the heat generation rate gradient b/a, it is possible to considerably reduce man-hours while ensuring a high accuracy compared with the conventional art (for example, a plurality of parameters is identified relative to the various operation conditions using the Wiebe function). Therefore, various elements for designing an engine can be effectively reviewed using the heat generation rate waveform (triangular waveform), which leads to reduction in development cost.

Also, as described above, the heat generation rate waveform is produced by calculating the first-half combustion period a based on the in-cylinder volume $V_{@dQpeak}$ at heat generation rate maximum time and the engine rotation speed Ne, and by calculating the heat generation rate gradient b/a based on the fuel density $\rho_{fuel@dQpeak}$ at heat generation rate maximum time. Thus, the heat generation rate waveform is produced according to physical phenomena in the combustion state in the cylinder. In this respect, the heat generation rate waveform calculated by the heat generation rate waveform calculation device 1 according to this embodiment can be highly reliable in comparison with the conventional method for producing the heat generation rate waveform using the Wiebe function to which various parameters such as a shape parameter are mathematically matched so as to simply match the waveform shape.

Furthermore, in this embodiment, it is not necessary to produce the entire heat generation rate waveform. As described above, the first-half combustion period a can be calculated based on the in-cylinder volume $V_{@dQpeak}$ at heat generation rate maximum time and the engine rotation speed Ne, while the heat generation rate gradient b/a can be calculated based on the fuel density $\rho_{fuel@dQpeak}$ at heat generation rate maximum time. For this reason, it is possible to estimate/evaluate the initial combustion speed (heat generation rate gradient) upon ignition of the air-fuel mixture and the first-half combustion period a more simply than by the conventional art, while ensuring a required accuracy.

Also, as described above, the first-half combustion period a and the heat generation rate gradient b/a, which are to be estimated in this embodiment, are estimated respectively as the values independent from each other (i.e., values not depending from each other). For this reason, the first-half combustion period a is estimated as a value that is not affected by an estimation error that may be included in the heat generation rate gradient b/a, while the heat generation rate gradient b/a is estimated as a value that is not affected by an estimation error that may be included in the first-half combustion period a. As a result, it is possible to ensure the accuracy in the estimated values.

Other Embodiments

The embodiment as described above is a case in which the present invention is applied to a heat generation rate waveform calculation device to calculate a heat generation rate waveform of the gasoline engine for a vehicle. The present invention is not limited thereto, and it can be applied to a spark ignition engine used for other purpose than mounting on the vehicle. Also, the present invention is not limited to application to the gasoline engine, and it can be applied, for example, to a gas engine.

Also, the method for calculating the heat generation rate waveform, which is performed by the heat generation rate waveform calculation device as described in the above embodiment, is within the technical idea of the present invention.

In the embodiment as described above, the heat generation rate gradient b/a is calculated based on the fuel density $\rho_{fuel@dQpeak}$ at heat generation rate maximum time, as exemplarily expressed by the expression (4). However, the present invention is not limited thereto. The heat generation rate gradient b/a may be calculated based on a fuel density in a predetermined period that is set in advance (for example, the period in which the heat generation rate reaches a predetermined rate relative to the maximum heat generation rate). In this case, the respective coefficients in the expression (4) are identified based on experiments and the like according to a predetermined heat generation rate that is set in advance.

That is, the heat generation rate gradient b/a may be calculated based on, for example, the fuel density at the time where the heat generation rate reaches 80% of the maximum heat generation rate (the rate may be appropriately set), in the period in which the heat generation rate increases (heat generation rate increasing period) from the ignition time FA to the heat generation rate maximum time dQpeakA. However, since the correlation between the fuel density $\rho_{fuel@dQpeak}$ at heat generation rate maximum time and the heat generation rate gradient b/a is the highest, it is preferable to set the time where the heat generation rate is maximum as the "time where the heat generation rate reaches the predetermined heat generation rate that is set in advance".

Also, in the above described embodiment, the heat generation rate gradient b/a calculated based on the fuel density $\rho_{fuel@dQpeak}$ at heat generation rate maximum time is basically corrected based on the combustion efficiency, the engine rotation speed, the in-cylinder volume at heat generation rate maximum time, the air-fuel ratio, the EGR rate and the like. However, the correction may be performed if it is necessary. It can also be completely omitted.

Furthermore, the method for calculating the ignition delay period τ and the first-half combustion period a of the air-fuel mixture in the above-described embodiment is also merely one example, thus is not limited thereto. For example, the ignition delay period τ and the first-half combustion period a may be determined by experiments or simulations.

The heat generation rate waveform calculation device 1 according to the above-described embodiment is to output the triangular waveform. However, the present invention is not limited thereto. The produced triangular waveform may be subjected to predetermined filter processing so as to produce the heat generation rate waveform to output.

INDUSTRIAL APPLICABILITY

With the present invention, it is possible to reduce man-hours to produce a heat generation rate waveform of a spark-ignition internal combustion engine, and to reduce cost. Thus, it can be applied, for example, to an internal combustion engine for a vehicle.

DESCRIPTION OF REFERENCE NUMERALS

1 Heat generation rate waveform calculation device
a First-half combustion period (Period from ignition time to heat generation rate maximum time)
b Maximum heat generation rate (heat generation rate at heat generation rate maximum time)
b/a Heat generation rate gradient
a+c Combustion period (Crank angle period from ignition of air-fuel mixture to combustion completion)
dQpeakA Heat generation rate maximum time
$V_{@dQpeak}$ In-cylinder volume at heat generation rate maximum time
$\rho_{fuel@dQpeak}$ Fuel density at heat generation rate maximum time
k Correction coefficient based on combustion efficiency
$Ne^\varepsilon$ Correction coefficient based on engine rotation speed
$V_{@dQpeak}{}^\eta$ Correction coefficient based on in-cylinder volume at heat generation rate maximum time
$Q_{all}/n_{air}$ Correction coefficient based on air-fuel ratio
$(100-ek_{egr})/100$ Correction coefficient based on EGR rate

The invention claimed is:

1. A heat generation rate waveform calculation device of an internal combustion engine, the device being configured to calculate a heat generation rate waveform of a spark-ignition internal combustion engine,
    wherein an increase rate of a heat generation rate relative to a change in a crank angle in a heat generation rate increasing period in which the heat generation rate increases after ignition of an air-fuel mixture is defined as a heat generation rate gradient that is one of characteristic values of the heat generation rate waveform, and
    wherein the heat generation rate gradient is estimated based on an in-cylinder fuel density at a predetermined time that is set in advance in the heat generation rate increasing period, so that the heat generation rate waveform is calculated using the estimated heat generation rate gradient.

2. The heat generation rate waveform calculation device of an internal combustion engine according to claim 1,
    wherein an average increase rate of the heat generation rate in a period from the ignition time of the air-fuel mixture to a heat generation rate maximum time where the heat generation rate is maximum is defined as the heat generation rate gradient, and
    wherein the heat generation rate gradient is calculated as a linear function of a fuel density at the heat generation rate maximum time.

3. The heat generation rate waveform calculation device of an internal combustion engine according to claim 1,
    wherein the heat generation rate gradient is calculated by being multiplied by a correction coefficient based on a combustion efficiency.

4. The heat generation rate waveform calculation device of an internal combustion engine according to claim 1,
    wherein the heat generation rate gradient is calculated by being multiplied by a correction coefficient based on an engine rotation speed.

5. The heat generation rate waveform calculation device of an internal combustion engine according to claim 1,
    wherein the heat generation rate gradient is calculated by being multiplied by a correction coefficient based on an in-cylinder volume at a heat generation rate maximum time.

6. The heat generation rate waveform calculation device of an internal combustion engine according to claim 1,
    wherein the heat generation rate gradient is calculated by being multiplied by a correction coefficient based on an air-fuel ratio.

7. The heat generation rate waveform calculation device of an internal combustion engine according to claim 1,
    wherein the heat generation rate gradient is calculated by being multiplied by a correction coefficient based on an exhaust gas recirculation (EGR) rate.

8. The heat generation rate waveform calculation device of an internal combustion engine according to claim 1,
    wherein the heat generation rate waveform is approximated by a triangular waveform with a crank angle period from the ignition of the air-fuel mixture to combustion completion as a base and the heat generation rate at a heat generation rate maximum time as an apex, and
    wherein, in the triangular waveform, a gradient of an oblique side that represents the heat generation rate from the ignition time to a heat generation rate maximum time is defined as the heat generation rate gradient.

9. The heat generation rate waveform calculation device of an internal combustion engine according to claim 8,
    wherein the triangular waveform is produced under a condition that a period from the ignition time to the heat generation rate maximum time in the triangular waveform is not affected by any of an engine load rate, an air-fuel ratio, an exhaust gas recirculation (EGR) rate and an oil-water temperature.

10. A method for calculating a heat generation rate waveform of a spark-ignition internal combustion engine, comprising the steps of:
    defining an increase rate of a heat generation rate relative to a change in a crank angle in a heat generation rate increasing period in which the heat generation rate increases after ignition of an air-fuel mixture as a heat generation rate gradient that is one of characteristic values of the heat generation rate waveform;
    estimating the heat generation rate gradient based on an in-cylinder fuel density at a predetermined time that is set in advance in the heat generation rate increasing period; and
    calculating the heat generation rate waveform using the estimated heat generation rate gradient.

11. The method for calculating a heat generation rate waveform of an internal combustion engine according to claim 10, further comprising the steps of:
    defining an average increase rate of the heat generation rate in a period from an ignition time of the air-fuel mixture to a heat generation rate maximum time where the heat generation rate is maximum as the heat generation rate gradient; and
    calculating the heat generation rate gradient as a linear function of a fuel density at the heat generation rate maximum time.

* * * * *